United States Patent
Jeong et al.

(10) Patent No.: US 10,167,377 B2
(45) Date of Patent: Jan. 1, 2019

(54) PHOSPHORUS CONTAINING EPOXY COMPOUNDS AND COMPOSITIONS THEREFROM

(71) Applicant: FRX POLYMERS, INC., Chelmsford, MA (US)

(72) Inventors: Youmi Jeong, Boxborough, MA (US); Jan-Pleun Lens, Boston, MA (US)

(73) Assignee: FRX POLYMERS, INC., Chelmsford, MA (US)

(*) Notice: Subject to any disclaimer, the term of this patent is extended or adjusted under 35 U.S.C. 154(b) by 154 days.

(21) Appl. No.: 14/160,963

(22) Filed: Jan. 22, 2014

(65) Prior Publication Data
US 2014/0205832 A1    Jul. 24, 2014

Related U.S. Application Data

(60) Provisional application No. 61/755,235, filed on Jan. 22, 2013.

(51) Int. Cl.
| | |
|---|---|
| *C08G 59/30* | (2006.01) |
| *C08L 63/00* | (2006.01) |
| *C08K 5/11* | (2006.01) |
| *C08G 65/22* | (2006.01) |
| *C08K 5/5373* | (2006.01) |
| *C08K 5/06* | (2006.01) |
| *C08L 23/28* | (2006.01) |

(52) U.S. Cl.
CPC .............. *C08K 5/11* (2013.01); *C08G 59/304* (2013.01); *C08G 65/22* (2013.01); *C08K 5/06* (2013.01); *C08K 5/5373* (2013.01); *C08L 23/28* (2013.01); *Y10T 428/249991* (2015.04); *Y10T 428/31511* (2015.04); *Y10T 428/31525* (2015.04); *Y10T 428/31529* (2015.04); *Y10T 442/268* (2015.04); *Y10T 442/2672* (2015.04)

(58) Field of Classification Search
CPC ....... C09D 185/02; C08G 79/04; C08L 63/00; C08L 23/28; C08L 77/06; C08L 85/02
See application file for complete search history.

(56) References Cited

U.S. PATENT DOCUMENTS

| | | |
|---|---|---|
| 2,271,610 A | 2/1942 | Angell |
| 2,435,252 A | 2/1948 | Toy |
| 2,534,242 A | 12/1950 | Cusic |
| 2,534,252 A | 12/1950 | Engler |
| 2,682,522 A | 6/1954 | Coover, Jr. et al. |
| 2,716,101 A | 8/1955 | Coover, Jr. et al. |
| 2,891,915 A | 6/1959 | McCormack et al. |
| 2,925,206 A | 2/1960 | Hancock |
| 2,925,208 A | 2/1960 | Wood |
| 3,153,008 A | 10/1964 | Fox |
| 3,271,329 A | 9/1966 | Coover, Jr. et al. |
| 3,326,852 A | 6/1967 | Thomas |
| 3,442,854 A | 5/1969 | Curtius et al. |
| 3,450,677 A | 6/1969 | McConnell et al. |
| 3,719,727 A | 3/1973 | Masai et al. |
| 3,829,405 A | 8/1974 | Cohen et al. |
| 3,830,771 A | 8/1974 | Cohen et al. |
| 3,900,444 A | 8/1975 | Racky et al. |
| 3,919,363 A | 11/1975 | Ura et al. |
| 3,925,303 A | 12/1975 | Rio et al. |
| 3,932,351 A | 1/1976 | King |
| 3,932,566 A | 1/1976 | Reader |
| 3,940,366 A | 2/1976 | Mark |
| 3,945,954 A | 3/1976 | Batorewicz |
| 3,946,093 A | 3/1976 | Koto et al. |
| 3,948,860 A | 4/1976 | Ogawa et al. |
| 3,952,072 A | 4/1976 | Yonemitsu et al. |
| 4,033,927 A | 7/1977 | Borman |
| 4,035,436 A * | 7/1977 | Matsubara .................. C09J 5/06 156/218 |
| 4,036,811 A | 7/1977 | Noetzel et al. |
| 4,039,512 A | 8/1977 | Kim et al. |
| 4,046,724 A | 9/1977 | Kato et al. |
| 4,048,106 A | 9/1977 | Hermans |
| 4,064,107 A | 12/1977 | Stackman et al. |
| 4,078,016 A | 3/1978 | Kramer |
| 4,093,582 A | 6/1978 | Mark et al. |
| 4,152,373 A | 5/1979 | Honig |
| 4,180,495 A | 12/1979 | Sandler |
| 4,196,119 A | 4/1980 | Evans |
| 4,205,162 A | 5/1980 | Herscovici |
| 4,207,721 A | 6/1980 | Raudat et al. |
| 4,223,104 A | 9/1980 | Kim et al. |
| 4,229,552 A | 10/1980 | Shiozaki et al. |
| 4,254,177 A | 3/1981 | Fulmer |
| 4,258,153 A | 3/1981 | Yomamoto et al. |
| 4,322,520 A | 3/1982 | Schmidt et al. |
| 4,322,530 A | 3/1982 | Jachimowicz |
| 4,328,174 A | 5/1982 | Schmidt et al. |

(Continued)

FOREIGN PATENT DOCUMENTS

| | | | |
|---|---|---|---|
| CN | 1777632 A | | 5/2006 |
| CN | 1810813 A | * | 8/2006 |

(Continued)

OTHER PUBLICATIONS

Sun et al., "Synthesis and properties of a phosphorus-containing flame retardant epoxy resin based on bis-phenoxy (3-hydroxy) phenyl phosphine oxide," Polymer Degradation and Stability, vol. 92 (2007), pp. 956-961.*

(Continued)

*Primary Examiner* — Randy P Gulakowski
*Assistant Examiner* — Ha S Nguyen
(74) *Attorney, Agent, or Firm* — Pepper Hamilton LLP

(57) ABSTRACT

Epoxy containing phosphonate monomers, polymers, copolymers, oligomers and co-oligomers and methods for making the same are describes herein. These materials can be used to make polymers, and can be combined with other polymers, oligomers or monomer mixtures to make resins with excellent fire resistance that can be used in a variety of industrial and consumer products.

25 Claims, No Drawings

(56) References Cited

U.S. PATENT DOCUMENTS

| | | |
|---|---|---|
| 4,331,614 A | 5/1982 | Schmidt et al. |
| 4,332,921 A | 6/1982 | Schmidt et al. |
| 4,350,793 A | 9/1982 | Schmidt et al. |
| 4,374,971 A | 2/1983 | Schmidt et al. |
| 4,377,537 A | 3/1983 | Block et al. |
| 4,401,802 A | 8/1983 | Schmidt et al. |
| 4,403,075 A | 9/1983 | Byrd et al. |
| 4,408,033 A | 10/1983 | Hefner, Jr. |
| 4,412,055 A | 10/1983 | Hefner, Jr. |
| 4,415,719 A | 11/1983 | Schmidt et al. |
| 4,430,492 A | 7/1984 | Schreckenberg et al. |
| 4,474,937 A | 10/1984 | Bales |
| 4,481,350 A | 11/1984 | Schmidt et al. |
| 4,508,890 A | 4/1985 | Schmidt et al. |
| 4,564,468 A | 1/1986 | Barda |
| 4,580,110 A | 4/1986 | Bhattacharya et al. |
| 4,594,404 A | 6/1986 | Kawakami et al. |
| 4,636,737 A | 1/1987 | Bhattacharya et al. |
| 4,668,720 A | 5/1987 | Kauth et al. |
| 4,690,954 A | 9/1987 | Wampfler et al. |
| 4,690,964 A | 9/1987 | Schmidt et al. |
| 4,701,554 A | 10/1987 | Kauth et al. |
| 4,719,279 A | 1/1988 | Kauth et al. |
| 4,722,983 A * | 2/1988 | Monnier ............ C07D 303/22 525/507 |
| 4,762,905 A | 8/1988 | Schmidt et al. |
| 4,782,123 A | 11/1988 | Kauth et al. |
| 4,788,259 A | 11/1988 | Nielinger et al. |
| 4,829,134 A * | 5/1989 | Sakamoto .......... C08G 59/4014 525/410 |
| 4,970,429 A | 11/1990 | Joswig et al. |
| 5,003,029 A | 3/1991 | Ueda et al. |
| 5,034,056 A | 7/1991 | von Bonin |
| 5,039,775 A | 8/1991 | Oyaizu |
| 5,086,153 A | 2/1992 | Oyaizu |
| 5,202,438 A | 4/1993 | Paul |
| 5,216,113 A | 6/1993 | Shulz-Schlitte et al. |
| 5,256,714 A | 10/1993 | Liu et al. |
| 5,319,058 A | 6/1994 | Hattori et al. |
| 5,326,805 A | 7/1994 | Sicken et al. |
| 5,326,850 A | 7/1994 | Goetz et al. |
| 5,334,692 A | 8/1994 | Hess et al. |
| 5,334,694 A | 8/1994 | Jung et al. |
| 5,340,905 A | 8/1994 | Kuhling et al. |
| 5,362,783 A | 11/1994 | Eiffler et al. |
| 5,373,082 A | 12/1994 | Kauth et al. |
| 5,393,621 A | 2/1995 | Chaloner-Gill |
| 5,409,976 A | 4/1995 | Lindsay |
| 5,525,681 A | 6/1996 | Barron et al. |
| 5,639,800 A | 6/1997 | von Bonin et al. |
| 5,652,275 A | 7/1997 | Buysch et al. |
| 5,719,200 A | 2/1998 | Staendeke et al. |
| 5,780,534 A | 7/1998 | Kleiner et al. |
| 5,837,760 A | 11/1998 | Hackl et al. |
| 5,919,844 A | 7/1999 | Shimizu et al. |
| 5,922,826 A | 7/1999 | Kuze et al. |
| 6,013,707 A | 1/2000 | Kleiner et al. |
| 6,066,700 A | 5/2000 | Konig et al. |
| 6,128,214 A | 10/2000 | Kuekes et al. |
| 6,153,212 A | 11/2000 | Mao et al. |
| 6,207,736 B1 | 3/2001 | Nass et al. |
| 6,221,939 B1 | 4/2001 | Cambell et al. |
| 6,255,371 B1 | 7/2001 | Schlosser et al. |
| 6,256,767 B1 | 7/2001 | Kuekes et al. |
| 6,288,210 B1 | 9/2001 | Shobha et al. |
| 6,291,630 B1 | 9/2001 | Konig et al. |
| 6,291,700 B1 | 9/2001 | Cella et al. |
| 6,314,019 B1 | 11/2001 | Kuekes et al. |
| 6,346,574 B1 | 2/2002 | Nishihara |
| 6,365,071 B1 | 4/2002 | Jenewein et al. |
| 6,419,709 B1 | 7/2002 | Mao et al. |
| 6,509,401 B1 | 1/2003 | Jenewein et al. |
| 6,518,347 B1 | 2/2003 | Boyd et al. |
| 6,642,288 B1 | 11/2003 | Hulskotte |
| 6,861,499 B2 | 3/2005 | Vinciguerra et al. |
| 6,872,797 B2 | 3/2005 | Ueno et al. |
| 7,153,901 B2 | 12/2006 | Hussain et al. |
| 7,449,526 B2 | 11/2008 | Levchik et al. |
| 7,645,850 B2 | 1/2010 | Freitag |
| 7,666,932 B2 | 2/2010 | Freitag et al. |
| 7,816,486 B2 | 10/2010 | Freitag et al. |
| 7,838,604 B2 | 11/2010 | Freitag |
| 7,862,749 B2 | 1/2011 | Sjerps |
| 7,888,534 B2 | 2/2011 | Freitag et al. |
| 7,893,143 B2 | 2/2011 | Peerlings et al. |
| 7,928,259 B2 | 4/2011 | Freitag et al. |
| 8,093,320 B2 | 1/2012 | Freitag et al. |
| 8,389,664 B2 | 3/2013 | Freitag et al. |
| 8,530,044 B2 | 9/2013 | Kagumba et al. |
| 8,563,638 B2 | 10/2013 | Kagumba et al. |
| 8,779,041 B2 | 7/2014 | Kagumba et al. |
| 2002/0040978 A1 | 4/2002 | Narayan et al. |
| 2002/0115793 A1 | 8/2002 | Gagne et al. |
| 2002/0137874 A1 | 9/2002 | Hucks et al. |
| 2002/0156160 A1 | 10/2002 | Martin |
| 2002/0177649 A1 | 11/2002 | Isozaki |
| 2003/0133679 A1 | 7/2003 | Murphy et al. |
| 2003/0149145 A1 | 8/2003 | Bienmuller et al. |
| 2004/0137227 A1 | 7/2004 | Masuda et al. |
| 2004/0167284 A1 | 8/2004 | Vinciguerra et al. |
| 2004/0197301 A1 | 10/2004 | Zhao et al. |
| 2005/0020800 A1 | 1/2005 | Levchik et al. |
| 2005/0137300 A1 | 6/2005 | Schlosser et al. |
| 2005/0222370 A1 | 10/2005 | Freitag et al. |
| 2005/0245647 A1 | 11/2005 | Masuda et al. |
| 2006/0020064 A1 | 1/2006 | Bauer et al. |
| 2006/0020104 A1 | 1/2006 | Freitag |
| 2006/0079612 A1 | 4/2006 | Troutman et al. |
| 2006/0142427 A1 | 6/2006 | Levchik et al. |
| 2006/0287418 A1 | 12/2006 | Bauer et al. |
| 2007/0032633 A1 | 2/2007 | Freitag et al. |
| 2007/0129511 A1 | 6/2007 | Freitag |
| 2007/0149663 A1 | 6/2007 | Schmidt et al. |
| 2007/0203269 A1 | 8/2007 | Freitag et al. |
| 2007/0203275 A1 | 8/2007 | Kikuchi et al. |
| 2007/0219295 A1 | 9/2007 | Levchik et al. |
| 2008/0045673 A1 | 2/2008 | Piotrowski et al. |
| 2008/0114127 A1 | 5/2008 | Freitag et al. |
| 2009/0032770 A1 | 2/2009 | Freitag et al. |
| 2009/0043013 A1 | 2/2009 | Stahl et al. |
| 2009/0149582 A1 | 6/2009 | Peerlings et al. |
| 2009/0306236 A1 | 12/2009 | Sounik et al. |
| 2009/0326108 A1 | 12/2009 | Kim et al. |
| 2010/0056660 A1 | 3/2010 | Rosthauser |
| 2010/0130703 A1 | 5/2010 | Freitag |
| 2010/0204354 A1 | 8/2010 | Freitag et al. |
| 2010/0298475 A1 | 11/2010 | Wilson et al. |
| 2011/0021676 A1 | 1/2011 | Hoerold et al. |
| 2011/0039987 A1 | 2/2011 | Freitag |
| 2011/0237695 A1 | 9/2011 | Hoerold et al. |
| 2011/0263745 A1 | 10/2011 | Wanzke et al. |
| 2012/0121843 A1 | 5/2012 | Lebel et al. |
| 2012/0172500 A1 | 7/2012 | Freitag et al. |
| 2012/0264844 A1 | 10/2012 | Freitag et al. |
| 2014/0000751 A1 | 1/2014 | Kagumba et al. |

FOREIGN PATENT DOCUMENTS

| | | |
|---|---|---|
| CN | 103059264 A | 4/2013 |
| DE | 2252258 | 5/1974 |
| DE | 2447727 A1 | 4/1976 |
| DE | 2909442 A1 | 9/1980 |
| DE | 2925206 A1 | 1/1981 |
| DE | 2925208 A1 | 1/1981 |
| DE | 19734437 A1 | 2/1999 |
| DE | 19737727 A1 | 7/1999 |
| DE | 10317487 A1 | 1/2004 |
| EP | 0171730 A1 | 2/1986 |
| EP | 0077493 B1 | 3/1987 |
| EP | 0383978 A1 | 8/1990 |
| EP | 0584567 A2 | 3/1994 |
| EP | 0699708 A2 | 3/1996 |
| EP | 0962521 A1 | 12/1999 |
| EP | 1026191 A1 | 9/2000 |

(56) References Cited

FOREIGN PATENT DOCUMENTS

| | | | |
|---|---|---|---|
| EP | 1935944 | 6/2008 | |
| GB | 2043083 | 1/1980 | |
| JP | 51-111869 | 10/1976 | |
| JP | 60-161993 A | 8/1985 | |
| JP | 61-134395 A | 6/1986 | |
| JP | 03-281652 | 12/1991 | |
| JP | 09-255877 | 9/1997 | |
| JP | 10-007766 A | 1/1998 | |
| JP | 2000-319356 A | 11/2000 | |
| JP | 2001-002931 A | 1/2001 | |
| JP | 2001019746 A | 1/2001 | |
| JP | 2001-139823 A | 5/2001 | |
| JP | 2002194313 A * | 7/2002 | |
| JP | 2002-363259 A | 12/2002 | |
| JP | 2004-044022 A | 2/2004 | |
| JP | 2004-052131 A | 2/2004 | |
| JP | 2007-502904 A2 | 2/2007 | |
| JP | 2010-533777 A | 10/2010 | |
| KR | 10-1980-000093 B1 | 1/1980 | |
| WO | WO 97/39053 | 10/1997 | |
| WO | WO 97/42264 | 11/1997 | |
| WO | WO 99/46315 A1 | 9/1999 | |
| WO | WO 03/029258 A1 | 4/2003 | |
| WO | WO 03029258 A1 * | 4/2003 | C07F 9/4084 |
| WO | WO 2004/076536 A1 | 9/2004 | |
| WO | WO 2004/076537 A1 | 9/2004 | |
| WO | WO 2004/113411 A1 | 12/2004 | |
| WO | WO 2006/026616 A1 | 3/2006 | |
| WO | WO 2007/022008 A2 | 2/2007 | |
| WO | WO 2007/065094 A2 | 6/2007 | |
| WO | WO 2008/011941 A1 | 1/2008 | |
| WO | WO 2009/012286 A1 | 1/2009 | |
| WO | WO 2009/018336 A2 | 2/2009 | |
| WO | WO 2010/048121 A1 | 4/2010 | |

OTHER PUBLICATIONS

Bhuniya et al., "Synthesis and characterization of phosphorus containing adhesive polymers" Indian Journal of Chemical Technology, vol. 9, (2002), pp. 103-111.*
AddCon '95: Worldwide Activities and Polymer Modifiers conference, Paper 3, p. 6, Apr. 5-6, 1995.
American Society for Test Methods, Test ASTMD2863, (2006), http://www.astm.org/cgi-bin/SoftCart.exe/DATABASE.CART/REDLINEPAGES/D2863.HTM?L+mystore_ltgw1337.
Becker et al., Polyurethane, *Plastics Handbook*, vol. 7, Germany, Vienna, Carl Hanser Publishing, (1983), (TOC).
Billmeyer, Textbook of Polymer Science, 2nd ed., Wiley Interscience, New York, 1971, pp. 45-52.
Cotter et al., Engineering Plastics: A Handbook of Polyarylethers, Science Publ. S.A., Switzerland 1995 (TOC).
English Abstract for DE 10317487 dated Jan. 22, 2004.
Failla et al., Synthesis, characterization, and properties of new phosphorous-containing epoxy resins, *Phosphorus, Sulfur, and Silicon and the Related Elements*, (2011), 186:2189-2201.
Groggins, Unite Processes in Organic Synthesis, 4th ed., McGraw Hill Book Co., 1952, pp. 616-620.

Hagenaars et al., Characterization of Melt-Polymerized Polycarbonate: Preparative Fractionation, Branching Distribution and Simulation, Polymer, (2001), 42:7653-766.
Henkel, Reactor Types and Their Industrial Applications, *Ullmann's Encyclopedia of Industrial Chemistry*, 31:293-327 (published online 2012), Wiley-VCH Verlag GmbH Co., KGaA, Weinheim (TOC).
International Search Report for PCT/US2011/052005 dated Apr. 27, 2012.
International Search Report for PCT/US2011/060428 dated May 21, 2012.
International Search Report for PCT/US2011/061015 dated Jun. 29, 2012.
International Search Report for PCT/US2011/066881 dated Aug. 22, 2012.
International Search Report for PCT/US2011/066828 dated Aug. 27, 2012.
International Search Report for PCT/US2012/051587 dated Feb. 26, 2013.
International Search Report for PCT/US2012/064664 dated Mar. 27, 2013.
International Search Report for PCT/US2013/048892 dated Oct. 11, 2013.
International Search Report for PCT/US2014/012497 dated May 28, 2014.
Legrand et al., eds., Handbook of Polycarbonates, Marcel Dekker, Inc., New York, (2000) TOC.
Levchik et al., Overview of Recent Developments in the Flame Retardancy of Polycarbonates, Polymer International, (2005), 54(7):981-998.
Levchik et al., A Review of Recent Progress in Phosphorus-based Flame Retardants, *Journal of Fire Sciences*, (Sep. 1, 2006), 24(5):345-364.
Lexan EXL Resin Data Sheet, Sabic Innovative Plastics (2007).
Liping et al., Organic Phosphorus Polymeric Flame Retardants, Chemistry, (2003), 66(11):1-6 (Machine translated document).
Morgan, Condensation Polymers, Wiley Interscience, New York, (1965):217-223.
Office Action dated Sep. 4, 2012 issued in JP 2010-517127—untranslated.
Polymeric Materials Encyclopedia, vol. 1, Editor-in-Chief Joseph C. Salamone, pp. 316-320 by CRC Press, 1996.
Rakotomala et al., Recent Developments in Halogen Free Retardants for Epoxy Resins for Electrical and Electronic Applications, *Materials*, (Aug. 11, 2010), 3:4300-4327.
Schnell, Chemistry and Physics of Polycarbones, *Polymer Review*, Bd. 9, pp. 50-51, Interscience Publishers: New York, 1964.
Schmidt et al., Aromatische Polyphosphonate: Thermoplastische Polymere von extremer Bandwidigeit, (1985), Die Angewandte Makromolekulate Chemie, 132(2165):1-18.
Supplemental European Search Report for EP11839579 dated Jan. 31, 2014.
Supplemental European Search Report for EP11851393 dated Feb. 28, 2014.
Ullmann's Encyclopedia of Industrial Chemistry, Ed. Barara Elvers, vol. A21, Chapter Polyesters, pp. 227-251, (1992), VCH, Weinheim-Basel-Cambridge-New York.
Wilkie et al., Fundamentals of Fire Testing and What Tests Measure, Fire Retardancy of Polymeric Materials, Ch. 14, CRC Press, Boca Raton, FL, $2^{nd}$ Ed., (2010) (TOC).

* cited by examiner

PHOSPHORUS CONTAINING EPOXY COMPOUNDS AND COMPOSITIONS THEREFROM

CROSS-REFERENCE TO RELATED APPLICATIONS

This application claims priority to U.S. Provisional No. 61/755,235 entitled "Phosphorous Containing Epoxy Compounds and Compositions Therefrom" filed Jan. 22, 2013, which is hereby incorporated by reference in its entirety.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Epoxy resins are among the most important industrial polymers in the world and are used in large quantities in the production of adhesives, paints and coatings, and matrix resins. The core substrate in the production of epoxy resins is typically 2,2-bis(4-hydroxyphenyl)isopropylidene (bisphenol A). The main monomer used in the epoxy resin industry is the diglycidyl ether of bisphenol A, (2,2-Bis(4-glycidyloxyphenyl)propane), which represents more than 75% of the resin used in industrial applications. The most common epoxy monomer is 2,2-Bis(4-glycidyloxyphenyl)propane, which is usually prepared from 2,2-Bis(4-hydroxyphenyl)isopropylidiene (bisphenol A) and epichlorohydrin using a strong base such as sodium hydroxide. Alternative synthetic methods have been developed such as allylating bisphenol A followed by epoxidization.

One significant application for epoxy resins derived from the diglycidyl ether of bisphenol A is in glass fiber reinforced laminates as rigid or flexible circuit board substrates used in a variety of industrial and consumer electronic products and electronic components. These materials must be fire resistant to meet safety requirements. The approach to render these materials fire resistant has been to use a variety of additives such as brominated compounds, phosphorous containing compounds, aluminum derivatives, melamine cyanurate, metal phosphinates and combinations thereof. Due to environmental considerations, some of the more commonly used halogenated flame retardants are being banned from use because they can leach out into the environment and are toxic. As is the case with most additives for polymers, the other flame retardants suffer from the same problem, it is just that they have not received the attention that the halogenated systems have, but many of them are toxic and they all are subject to leach out of the host resin. Thus there is a need to render epoxy derived resins fire resistant in a way that is practical, cost effective and environmentally friendly.

Processes for preparing flame retardant epoxy resin disclosed thus far are focused on the reaction of an epoxy resin with a flame-retardant additive or a curing agent or chain extender. An approach that produces an inherently flame retardant epoxy based monomer, oligomer, polymer, or co-polymer would be ideal. Phosphonate polymers, copolymers, oligomers and co-oligomers having a wide variety of chemical structures which may contain reactive end groups such as hydroxyl groups are known. However, prior art, which has disclosed the reaction of bisphenol A and epichlorohydrin with sodium hydroxide base is not applicable to phosphonate monomers or polymers, copolymers, oligomers or co-oligomers because the use of a strong base to conduct the synthesis causes hydrolysis of the phosphonate groups leading to chain cleavage (and thus reduction of molecular weight) and phosphonic acid groups as well as other unwanted reactions leading to a complex mixture of by-products.

SUMMARY OF THE INVENTION

Not applicable

DESCRIPTION OF DRAWINGS

Not applicable

DETAILED DESCRIPTION

The above summary of the present invention is not intended to describe each illustrated embodiment or every possible implementation of the present invention. The detailed description, which follows, particularly exemplifies these embodiments.

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described.

"Optional" or "optionally" means that the subsequently described event or circumstance may or may not occur, and that the description includes instances where the event occurs and instances where it does not.

"Substantially no" means that the subsequently described event may occur at most about less than 10% of the time or the subsequently described component may be at most about less than 10% of the total composition, in some embodiments, and in others, at most about less than 5%, and in still others at most about less than 1%.

The term "phenol" is meant to encompass any aromatic compound with at least one associated hydroxyl substitution. Examples of "phenols" include but are not limited to phenol, benzene diols such as hydroquinone, and any bisphenol or bisphenol containing compound.

The term "alkyl" or "alkyl group" refers to a branched or unbranched hydrocarbon or group of 1 to 20 carbon atoms, such as but not limited to methyl, ethyl, n-propyl, isopropyl, n-butyl, isobutyl, t-butyl, octyl, decyl, tetradecyl, hexadecyl, eicosyl, tetracosyl and the like. "Cycloalkyl" or "cycloalkyl groups" are branched or unbranched hydrocarbons in which all or some of the carbons are arranged in a ring such as but not limited to cyclopentyl, cyclohexyl, methylcyclohexyl and the like. The term "lower alkyl" includes an alkyl group of 1 to 10 carbon atoms.

The term "aryl" or "aryl group" refers to monovalent aromatic hydrocarbon radicals or groups consisting of one or more fused rings in which at least one ring is aromatic. Aryls may include but are not limited to phenyl, napthyl, biphenyl ring systems, and the like. The aryl group may be unsubstituted or substituted with a variety of substituents including but not limited to alkyl, alkenyl, halide, benzylic, alkyl or aromatic ether, nitro, cyano, and the like and combinations thereof.

The term "alkanol" or "alkanol group" refers to a compound including an alkyl of 1 to 20 carbon atoms or more having at least one hydroxyl group substituent. Examples of alkanols include but are not limited to methanol, ethanol, 1- and 2-propanol, 1,1-dimethylethanol, hexanol, octanol, and the like. Alkanol groups may be optionally substituted with substituents as described above.

The terms "flame retardant," "flame resistant," "fire resistant," or "fire resistance," as used herein, means that the composition exhibits a limiting oxygen index (LOI) of at least 27. "Flame retardant," "flame resistant," "fire resistant," or "fire resistance," may also be tested by measuring the after-burning time in accordance with the UL test (Subject 94). In this test, the tested materials are given classifications of UL-94 V-0, UL-94 V-1 and UL-94 V-2 on the basis of the results obtained with the ten test specimens. Briefly, the criteria for each of these UL-94-V-classifications are as follows:

UL-94 V-0: the total flaming combustion for each specimen after removal of the ignition flame should not exceed 10 seconds and the total flaming combustion for 5 specimens should not exceed 50 seconds. None of the test specimens should release any drips which ignite absorbent cotton wool.

UL-94 V-1: the total flaming combustion for each specimen after removal of the ignition flame should not exceed 30 seconds and the total flaming combustion for 5 specimens should not exceed 250 seconds. None of the test specimens should release any drips which ignite absorbent cotton wool.

UL-94 V-2: the total flaming combustion for each specimen after removal of the ignition flame should not exceed 30 seconds and the total flaming combustion for 5 specimens should not exceed 250 seconds. Test specimens may release flaming particles, which ignite absorbent cotton wool.

Fire resistance may also be tested by measuring after-burning time. These test methods provide a laboratory test procedure for measuring and comparing the surface flammability of materials when exposed to a prescribed level of radiant heat energy to measure the surface flammability of materials when exposed to fire. The test is conducted using small specimens that are representative, to the extent possible, of the material or assembly being evaluated. The rate at which flames travel along surfaces depends upon the physical and thermal properties of the material, product or assembly under test, the specimen mounting method and orientation, the type and level of fire or heat exposure, the availability of air, and properties of the surrounding enclosure. If different test conditions are substituted or the end-use conditions are changed, it may not always be possible by or from this test to predict changes in the fire-test-response characteristics measured. Therefore, the results are valid only for the fire test exposure conditions described in this procedure.

"Molecular weight," as used herein, can be determined by relative viscosity 1 and/or gel permeation chromatography (GPC). "Relative viscosity" of a polymer is measured by dissolving a known quantity of polymer in a solvent and comparing the time it takes for this solution and the neat solvent to travel through a specially designed capillary (viscometer) at a constant temperature. Relative viscosity is a measurement that is indicative of the molecular weight of a polymer. It is also well known that a reduction in relative viscosity is indicative of a reduction in molecular weight, and reduction in molecular weight causes loss of mechanical properties such as strength and toughness. GPC provides information about the molecular weight and molecular weight distribution of a polymer. It is known that the molecular weight distribution of a polymer is important to properties such as thermo-oxidative stability (due to different amount of end groups), toughness, melt flow, and fire resistance, for example, low molecular weight polymers drip more when burned.

The term "toughness," as used herein, means that the material is resistant to breaking or fracturing when stressed or impacted. There are a variety of standardized tests available to determine the toughness of a material. Generally, toughness is determined qualitatively using a film or a molded specimen.

Embodiments of the invention are directed to the compositions including epoxy containing phosphonate monomers, polymers, copolymers, oligomers, and co-oligomers, and methods for preparing these compositions. Phosphonate monomers, polymers, copolymers, oligomers, and co-oligomers may be linear, branched, or hyperbranched, and the co-polymers and co-oligomers may be block or random. The compositions of such embodiments may include any compound having at least one phosphonate and at least one epoxy. For example, in some embodiments, the composition may be of general structure I:

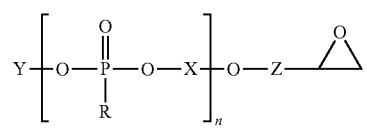

where R can be $C_1$ to $C_{20}$ alkyl, alkenyl, or alkynyl, substituted $C_1$ to $C_{20}$, alkyl, alkenyl, or alkynyl, $C_3$ to $C_{20}$ cycloalkyl, substituted $C_3$ to $C_{20}$ cycloalkyl, $C_6$ to $C_{20}$ aryl, or heteroaryl, or substituted $C_6$ to $C_{20}$ aryl or heteroaryl; X can be $C_1$ to $C_{20}$ alkylene, alkenylene, or alkynylene, substituted $C_1$ to $C_{20}$, alkylene, alkenylene, or alkynylene, $C_3$ to $C_{20}$ cycloalkylene, substituted $C_3$ to $C_{20}$ cycloalkylene, $C_6$ to $C_{20}$ arylene or heteroarylene, or substituted $C_6$ to $C_{20}$ arylene or heteroarylene; Y can be X—OH or X—O—Z-epoxy, $C_6$ to $C_{20}$ arylene or heteroarylene, or substituted $C_6$ to $C_{20}$ arylene or heteroarylene, carboxyl, amine, vinyl, isocyanate, and the like or combinations thereof; Z can be $C_1$ to $C_{20}$ alkylene, alkenylene, or alkynylene, substituted $C_1$ to $C_{20}$, alkylene, alkenylene, or alkynylene; and n can be an integer from 1 to 1000. In particular embodiments, R can be $C_1$ to $C_{20}$ alkyl, alkenyl, or alkynyl, substituted $C_1$ to $C_{20}$, alkyl, alkenyl, or alkynyl, $C_3$ to $C_8$ cycloalkyl, substituted $C_3$ to $C_8$ cycloalkyl, $C_6$ to $C_{20}$ aryl or heteroaryl, or substituted $C_6$ to $C_{20}$ aryl or heteroaryl, and in other embodiments, R can be $C_1$ to $C_{10}$ alkyl or $C_6$ to $C_{10}$ aryl or heteroaryl. In still other embodiments, R may be $C_1$ to $C_5$ alkyl, and in certain embodiments, R may be methyl. In some embodiments, X may be a, $C_6$ to $C_{20}$ arylene or heteroarylene, or substituted $C_6$ to $C_{20}$ arylene or heteroarylene, and in particular embodiments —O—X—O— may be derived from dihydroxy compounds such as, for example, hydroquinone, resorcinol or combinations of these, biphenol such as, for example, 4,4'-biphenol, or bisphenol such as, for example, bisphenol A, bisphenol F, phenolphthalein, 4,4'-thiodiphenol, 4,4'-sulfonyldiphenol, 3,3,5-trimethylcyclohexyldiphenol, or combinations of these or substituted dihydroxy compounds. In certain embodiments, Z may be $C_1$ to $C_5$ alkylene, and in certain embodiments, Z may be methylene.

Particular embodiments include monomeric units having the structures II, IIa, IIb:

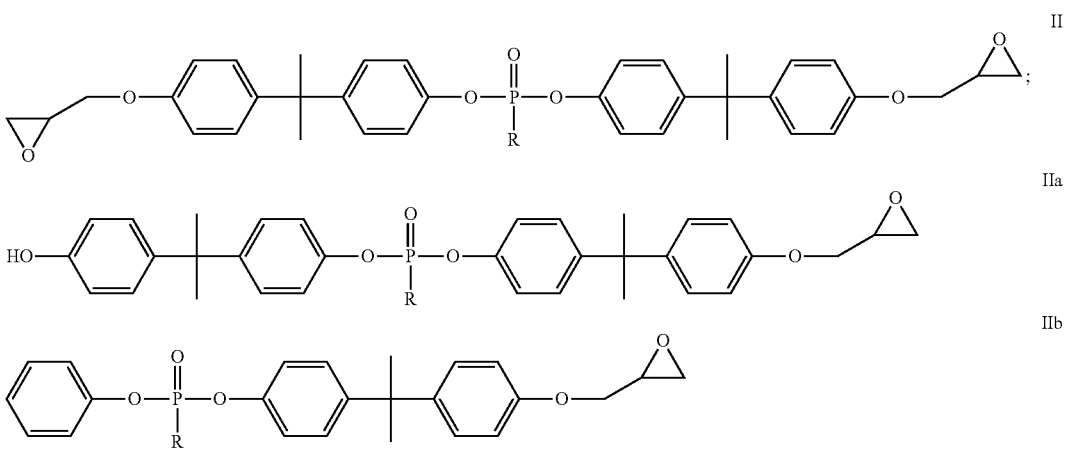

where R can be $C_1$ to $C_{10}$ alkyl or $C_6$ to $C_{10}$ aryl or heteroaryl, and in certain embodiments, R can be $C_1$ to $C_5$ alkyl, or methyl. Other embodiments include oligomeric phosphonates and polyphosphonates having the structures III, IIIa, and IIIb:

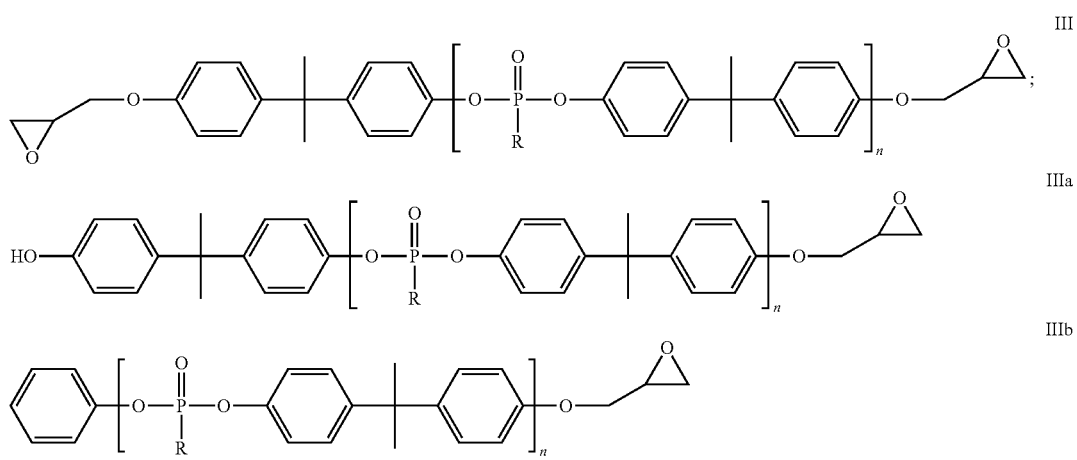

where R can be $C_1$ to $C_{10}$ alkyl or $C_6$ to $C_{10}$ aryl or heteroaryl, and in certain embodiments, R can be $C_1$ to $C_5$ alkyl, or methyl. In embodiments describing oligomeric phosphonates n can be from about 2 to about 10, and in embodiments describing polyphosphonates n can be 10 or more, for example, about 10 to about 1000.

Still other embodiments are directed to co-oligomeric phosphonates and co-polyphosphonates (collectively, "copolymers" or "copolyphosphonates"). Such copolymer can include randomly arranged monomeric units separately derived from phosphonate containing monomers and carbonate containing monomers. Examples of copolyphosphonates include those of general structure IV and V:

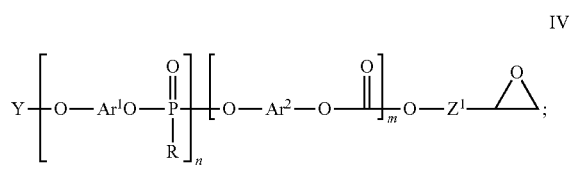

-continued

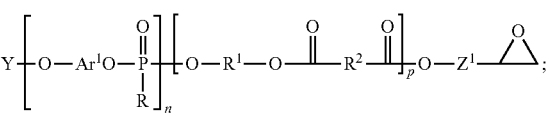

and combinations thereof, where $Ar^1$ and $Ar^2$ are each, independently, an aromatic group and —O—$Ar^1$—O— and —O—$Ar^2$—O— may be derived from a dihydroxy compound having one or more, optionally substituted aryl rings such as, but not limited to, resorcinols, hydroquinones, and bisphenols, such as bisphenol A, bisphenol F, 4,4'-biphenol, phenolphthalein, 4,4'-thiodiphenol, 4,4'-sulfonyldiphenol, 3,3,5-trimethylcyclohexyldiphenol, or combinations of these, $R^1$ and $R^2$ are aliphatic or aromatic hydrocarbons, R is a $C_{1-20}$ alkyl, $C_{2-20}$ alkene, $C_{2-20}$ alkyne, $C_{5-20}$ cycloalkyl, or $C_{6-20}$ aryl, Y is —H, —$Z^1$-epoxy, $Z^1$ may be $C_1$ to $C_{20}$ alkylene, alkenylene, or alkynylene, substituted $C_1$ to $C_{20}$ alkylene, alkenylene, or alkynylene, and each m, n, and p can be the same or different and can, independently, be an integer from 1 to about 100, 1 to about 50, or 2 to about 20, about 1 to about 10, or any integer between these ranges. In certain embodiments, each m, n and p are about equal and generally greater than 5 or less than 15.

As indicated by the term "random" the monomers of the "random co-oligo(phosphonate carbonate)s" or "random co-oligo(phosphonate ester)s of various embodiments are incorporated into the polymer chain randomly, such that the oligomeric phosphonate chain can include alternating phosphonate and carbonate or ester monomers or short segments in which several phosphonate or carbonate or ester monomers are linked by an aromatic dihydroxide. The length of such segments may vary within individual random co-oligo (phosphonate carbonate)s or co-oligo(phosphonate ester).

In particular embodiments, the Ar, $Ar^1$, and $Ar^2$ in the Formulae IV and V may be derived from bisphenol A and R may be a methyl group providing oligomeric phosphonates having reactive end-groups including random and block co-oligo(phosphonate carbonate)s and co-oligo(phosphonate ester)s. Such compounds may have structures such as, but not limited to, structures of Formulae VI and VII:

chromatography based on polystyrene calibration) range of the oligophosphonates, random or block co-oligo(phosphonate ester)s and co-oligo(phosphonate carbonate)s may be from about 500 g/mole to about 18,000 g/mole or any value within this range. In other embodiments, the molecular weight range may be from about 1,500 g/mole to about 15,000 g/mole, about 3,000 g/mole to about 10,000 g/mole, or any value within these ranges. In still other embodiments, the molecular weight range may be from about 700 g/mole to about 9,000 g/mole, about 1,000 g/mole to about 8,000 g/mole, about 3,000 g/mole to about 4,000 g/mole, or any value within these ranges.

Hyperbranched oligomers or polymers of various embodiments have a highly branched structure and a high degree of functionality (i.e., chemical reactivity). The branched structure of such hyperbranched phosphonate containing oligomers or polymers creates a high concentration of terminal groups, one at the end of nearly every branch, that can include a reactive functional group such as hydroxyl end groups, phosphonate esters, epoxy end groups, vinyl end groups, vinyl ester end groups, isopropenyl end groups, isocyanate end groups, and the like. In some embodiments,

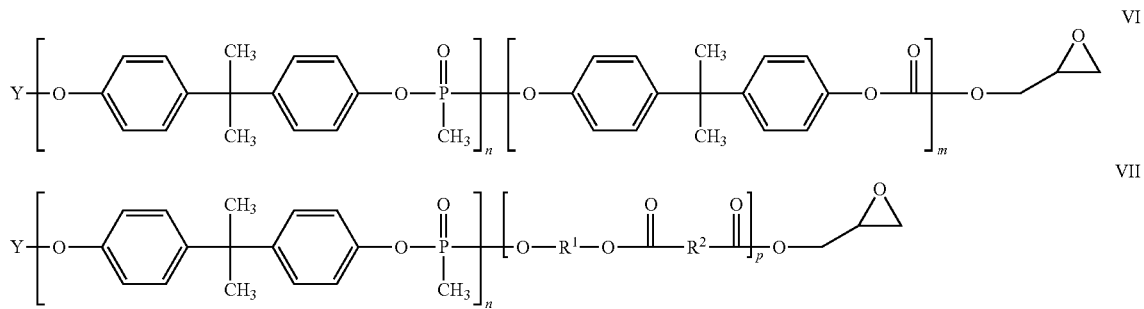

and combinations thereof, where each of m, n, p, Y, and $R^1$ and $R^2$ are defined as described above. Such co-oligo(phosphonate ester) or co-oligo(phosphonate carbonate) may be block co-oligo(phosphonate ester) or block co-oligo(phosphonate carbonate) in which each m, n, and p is greater than about 1, and the copolymers contain distinct repeating phosphonate and carbonate blocks or phosphonate and ester blocks. In other embodiments, the oligomeric co-oligo(phosphonate ester) or co-oligo(phosphonate carbonate) can be random copolymers in which each m, n, and p can vary and may be an integer from 1 to about 100, 1 to about 50, or 2 to about 20, or about 2 to about 10, where the total of m, n, and p is an integer from 1 to about 100, 1 to about 50, or 2 to about 20, or about 2 to about 10, or any integer between these ranges.

The phosphonate and carbonate content of the oligomeric phosphonates, random or block co-oligo(phosphonate carbonate)s and co-oligo(phosphonate ester)s may vary among embodiments, and embodiments are not limited by the phosphonate and/or carbonate content or range of phosphonate and/or carbonate content. For example, in some embodiments, the co-oligo(phosphonate carbonate)s or co-oligo(phosphonate ester)s may have a phosphorus content, of from about 1% to about 12% by weight of the total oligomer, and in other embodiments, the phosphorous content may be from about 2% to about 10% by weight of the total oligomer.

In some embodiments, the molecular weight (weight average molecular weight as determined by gel permeation the hyperbranched phosphonate containing oligomers may have a unique combination of chemical and physical properties when compared to linear oligomeric phosphonates. For example, the high degree of branching can prevent crystallization and can render chain entanglement unlikely, so the hyperbranched oligomers can exhibit solubility in organic solvents and low solution viscosity and melt viscosity especially when sheared.

In some embodiments, the hyperbranched oligomers can contain branches that are not perfectly (i.e., absolutely regular) arranged. For example, various branches on a single hyperbranched oligomer may have different lengths, functional group composition, and the like and combinations thereof. Consequently, in some embodiments, the hyperbranched oligomers of the invention can have a broad molecular weight distribution. In other embodiments, the hyperbranched oligomers of the invention may be perfectly branched, including branches that are nearly identical, and have a monodisperse molecular weight distribution.

The degree of branching for the hyperbranched oligomers of the invention can be defined as the number average fraction of branching groups per molecule, i.e., the ratio of terminal groups plus branch monomer units to the total number of terminal groups, branch monomer units, and linear monomer units. For linear oligomers, the degree of branching as defined by the number average fraction of branching groups per molecule is zero, and for ideal dendrimers, the degree of branching is one. Hyperbranched oligomers can have a degree of branching which is intermediate between that of linear oligomers and ideal dendrimers. For example, a degree of branching for hyperbranched oligomers may be from about 0.05 to about 1, about 0.25 to about 0.75, or about 0.3 to about 0.6, and in certain embodiments, the hyperbranched oligomers may have a number average fraction of branching groups about 0.5.

The hyperbranched oligomers of the invention may be generically represented by the following structure Formula VIII:

   VIII where B is the hyperbranched oligomer and w is the number of branches, v is an integer that is not zero, L is a linking group, and F is a reactive group and at least one F is epoxy.

The linking group (L) can be any moiety compatible with the chemistry of the monomers for the oligophosphonate, co-oligo(phosphonate ester), or co-oligo(phosphonate carbonate) described above. For example, in some embodiments, L can be any unit derived from an aryl or heteroaryl group including single aryl groups, biaryl groups, triaryl groups, tetraaryl groups, and so on. In other embodiments, L can be a covalent bond linking a functional group (F) directly to the hyperbranched oligomer, and in still other embodiments, L can be a $C_1$-$C_{10}$ alkyl, $C_2$-$C_{10}$ alkene, or $C_2$-$C_{10}$ alkyne that may or may not be branched.

The linking group (L) allows for attachment of one or more functional groups (F) to each branch termination of the hyperbranched oligomer. In some embodiments, each branch termination may have an attached linking group, and in other embodiments, one or more branch terminations of the hyperbranched oligomer (B) may not have an attached linking group. Such branch terminations without an attached linking group may terminate in a hydroxyl group or phenol group associated with the monomeric units of the hyperbranched oligomer. For branch terminations that include a linking group (L), each linking group may have from 0 to 5 or more associated functional groups. Thus, in some embodiments, one or more linking group of the reactive hyperbranched oligomer may have no attached functional groups, such that the branch termination associated with this linking group is substantially unreactive. In other embodiments, one or more linking groups of the reactive hyperbranched oligomer may have one or more attached functional groups providing a branch termination that is potentially reactive with other monomers, oligomers, or polymers, and in still other embodiments, one or more linking groups of the reactive hyperbranched oligomer can have multiple attached functional groups. For example, two of the aryl groups associated with a triaryl group may include a functional group (F) with the third aryl group attaching the linking group to the hyperbranched polymer or oligomer. The functional group (F) may vary among embodiments and can be any chemical moiety capable of reacting with another chemical moiety. Non-limiting examples of functional groups (F) include hydroxyl, carboxylic acid, amine, cyanate, isocyanate, epoxy, glycidyl ether, vinyl, and the like and combinations thereof. The reactive hyperbranched oligomers of the present invention are reactive with a variety of functional groups such as epoxies, anhydrides, activated halides, carboxylic acids, carboxylic esters, isocyanates, aldehydes, vinyls, acetylenes, amines, aliphatic and aromatic alcohols and silanes. These groups may be present on another monomer, oligomer, or polymer used in the preparation of a polymer composition.

The hyberbranched oligomer portion (B) of the general structure presented above may be any phosphonate containing hyperbranched oligomer. For example, in some embodiments, such hyperbranched oligomers may include repeating units derived from diaryl alkyl- or diaryl arylphosphonates, and in certain embodiments, such hyperbranched oligomers may have a structure including units of Formula IX:

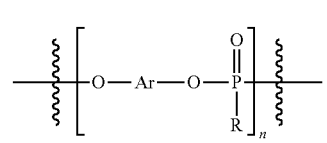   IX where Ar is an aromatic group and —O—Ar—O— may be derived from a compound having one or more, optionally substituted, aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, 3,3,5-trimethylcyclohexyldiphenol, or combinations of these, R is a $C_{1-20}$ alkyl, $C_{2-20}$ alkene, $C_{2-20}$ alkyne, $C_{5-20}$ cycloalkyl, or $C_{6-20}$ aryl, and n is an integer from 1 to about 20, 1 to about 10, or 2 to about 5, or any integer between these ranges.

The hyperbranched oligomers (B) of such embodiments may further include units derived from branching agents or multifunctional aryl or multifunctional biaryl groups, multifunctional triaryl groups, multifunctional tetra aryl, and so on. In some embodiments, the units derived from branching agents may be derived from, for example, polyfunctional acids, polyfunctional glycols, or acid/glycol hybrids. In other embodiments, the hyperbranched oligomeric phosphonates may have units derived from tri or tetrahydroxy aromatic compounds or triaryl or tetraaryl phosphoric acid esters, triaryl or tetraaryl carbonate or triaryl or tetraaryl esters or combinations thereof such as, but not limited to, trimesic acid, pyromellitic acid, trimellitic anhydride, pyromellitic anhydride, trimethylolpropane, dimethyl hydroxyl terephthalate, pentaerythritol, and the like and combinations thereof. Such branching agents provide branch points within the hyperbranched oligomeric phosphonate. In particular embodiments, the branching agent may be a triaryl phosphate such as, for example, those of Formula X:

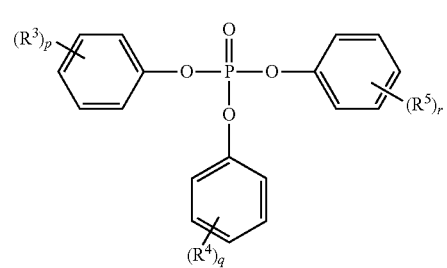   X where each $R^3$, $R^4$, and $R^5$ can, independently, be a hydrogen, $C_1$-$C_4$alkyl of, and each of p, q, and r are independently integers of from 1 to 5.

The number of branches (w) may be directly proportional to the number of units derived from a branching agent and may be any integer from about 2 to about 20. In some embodiments, n may be an integer greater than 3, greater than 5, or greater than 10 or any value within these ranges, and in other embodiments, n may be from about 5 to about 20, about 5 to about 15, about 5 to about 10, or any value between these ranges.

The reactive hyperbranched phosphonates of certain embodiments each branch (B) may have a structure of Formula XI or Formula XII:

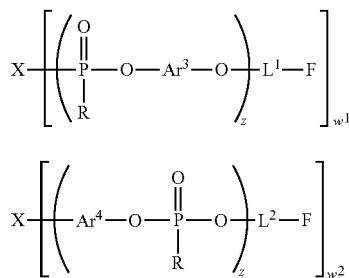

XI

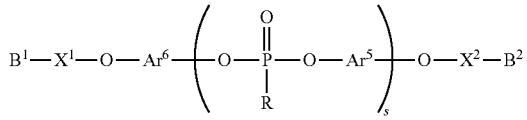

XIV

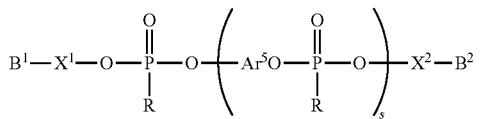

XV

XII here each $Ar^3$ and $Ar^4$ are, independently, an aromatic group and $-O-Ar^3-O-$ and $-O-Ar^4-O-$ can be derived from a dihydroxy compound having one or more, optionally substituted, aryl rings such as, but not limited to, resorcinols, hydroquinones, and bisphenols, such as bisphenol A, bisphenol F, 4,4'-biphenol, phenolphthalein, 4,4'-thiodiphenol, 4,4'-sulfonyldiphenol, 3,3,5,-trimethylcyclohexyldiphenol, or combinations of these, each $L^1$ and $L^2$ are, independently, a covalent bond or an aryl or heteroaryl group including single aryl groups, biaryl groups, triaryl groups, tetraaryl groups, and so on, R can be a $C_{1-20}$ alkyl, $C_{2-20}$ alkene, $C_{2-20}$ alkyne, $C_{5-20}$ cycloalkyl, or $C_{6-20}$ aryl, z is an integer from 1 to about 20, 1 to about 10, or 2 to about 5, or any integer between these ranges, and each $w^1$ and $w^2$ are, independently, 1 to 5. F can be any reactive group described above including, but not limited to, hydroxyl, carboxylic acid, amine, cyanate, isocyanate, epoxy, glycidyl ether, vinyl, and combinations thereof, and at least one F is epoxy.

X may be derived from any branching agent described above, and in particular embodiments, X may be derived from triarylphosphate of Formula X as described above. In some embodiments, branches having a structure of Formula XI and Formula XII may extend from the same branching agent (X). In certain embodiments, two or more X can be tethered together either directly or through a linker, which in some embodiments, may have the structure of the branches provided in Formula XI and Formula XII. For example, two or more X may be linked as illustrated in Formula XIII, Formula XIV, or Formula XV:

XIII

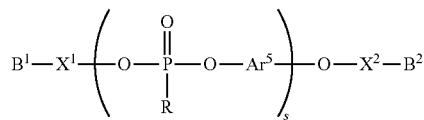

where each $B^1$ and $B^2$ are, independently, branches as described above, each $X^1$ and $X^2$ are, independently, derived from branching agents as described above, each $Ar^5$ and $Ar^6$ are, independently, an aromatic group and $-O-Ar^5-O-$ and $-O-Ar^6-O-$ can be derived from a dihydroxy compound having one or more, optionally substituted, aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, 3,3,5-trimethylcyclohexyldiphenol or combinations of these, each R is as defined as above, and s is an integer of from 1 to about 20, 1 to about 10, or 2 to about 5, or any integer there between.

In various embodiments, an individual reactive hyperbranched oligomer may have a structure in which portions of the oligomer can be any of Formula I, IIa, IIIa, and IV to VII in which Y is associated with a branching agent. Thus, embodiments encompass reactive hyperbranched oligomers having any combination of the Formulae provided above. In other embodiments, a reactive hyperbranched oligomer may be composed of substantially one or two structures of the Formulae presented above. For example, a hyperbranched oligomer may be composed of two units derived from branching agents (X) linked by a structure of Formula IIa with branches of Formula IIIa, or a hyperbranched oligomer may be composed of three or four branching agents linked by structures of Formulae IIa and IIIa with branches of structure Formula VI or VII. Of course as discussed above, any combination of Formulae are possible and could be present in a single reactive hyperbranched oligomer.

An exemplary representation of a reactive hyperbranched oligomer of the invention is provided below:

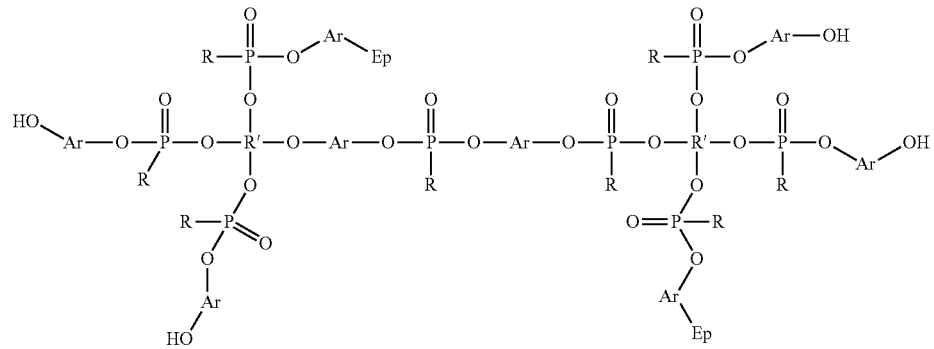

where Ar is an aryl or heteroaryl group, R is a $C_1$-$C_4$ alkyl group or an aryl group, and R' is an alkyl or aromatic group derived from a branching agent, and Ep is an epoxy reactive group.

In some embodiments, the molecular weight (weight average molecular weight as determined by gel permeation chromatography based on polystyrene calibration) range of the hyperbranched oligophosphonates, hyperbranched random or block co-oligo(phosphonate ester)s, and hyperbranched co-oligo(phosphonate carbonate)s may be from about 500 g/mole to about 18,000 g/mole or any value within this range. In other embodiments, the molecular weight range may be from about 1500 g/mole to about 15,000 g/mole, about 3000 g/mole to about 10,000 g/mole, or any value within these ranges. In still other embodiments, the molecular weight range may be from about 700 g/mole to about 9000 g/mole, about 1000 g/mole to about 8000 g/mole, about 3000 g/mole to about 4000 g/mole, or any value within these ranges.

The phosphonate and carbonate content of the hyperbranched oligomeric phosphonates, hyperbranched random or block co-oligo(phosphonate carbonate)s, and hyperbranched co-oligo(phosphonate ester)s may vary among embodiments, and embodiments are not limited by the phosphonate and/or carbonate content or range of phosphonate and/or carbonate content. For example, in some embodiments, the hyperbranched co-oligo(phosphonate carbonate)s or hyperbranched co-oligo(phosphonate ester)s may have a phosphorus content, of from about 2% to about 12% by weight, 2% to about 10% by weight, or less than 10% by weight of the total oligomer.

The reactive hyperbranched oligomers of various embodiments may have greater than about 20% or greater than about 50% epoxy end groups based on the total number of branch terminations as determined by known titration methods. In certain embodiments, the reactive hyperbranched oligomers may have greater than about 75% or greater than 90% of the epoxy end groups based on the total number of branch terminations as determined by titration methods. In further embodiments, the reactive hyperbranched oligomers may have from about 40% to about 98% epoxy end groups, about 50% to about 95% epoxy end groups, or from about 60% to about 90% epoxy end groups based on the total number of branch terminations. As discussed above individual branch terminations may have more than one reactive end group. Therefore, in some embodiments, the reactive hyperbranched oligomers may have greater than 100% epoxy end groups.

Termini that are not epoxy can be reactive or non-reactive end groups, and in certain embodiments, non-epoxy end groups may be reactive end groups. As discussed above, the term "reactive end groups" is used to describe any chemical moiety at a branch termination that is capable of reacting with another chemical moiety. A large number of reactive functional groups are known in the art and encompassed by the invention. In particular embodiments, the reactive end groups may be hydroxyl, vinyl, or isocyanate groups.

Without wishing to be bound by theory, due to their hyperbranched nature, the reactive hyperbranched oligomers or polymers of the invention may exhibit low melt viscosities when sheared as compared to linear oligomeric phosphonates. Thus, the reactive hyperbranched oligomers described herein can be blended with monomers, oligomers, and polymers without diminishing melt processability. The hyperbranched oligophosphonates of various embodiments, therefore, can provide better meltability and improved processing. In addition, the reactive hyperbranched oligomers of the invention may be of higher molecular weight and provide greater reactivity increasing the crosslinking and improving the toughness of polymer compositions over similar compositions prepared using linear oligomeric phosphonates. In some embodiments, the reactive hyperbranched oligomers of the invention may be used as reactive or non-reactive additives in thermoplastics to improve shear thinning. For example, hyperbranched oligomers may be prepared that have no or very few reactive end groups that can be used to improve shear thinning without reacting, or crosslinking, the polymer to which the oligomers are added.

The oligomeric phosphonates of various embodiments including linear and hyperbranched oligophosphonates can exhibit a high molecular weight and/or a narrow molecular weight distribution (i.e., low polydispersity). For example, in some embodiments, the oligomeric phosphonates may have a weight average molecular weight (Mw) of about 1,000 g/mole to about 18,000 g/mole as determined by $\eta_{rel}$ or GPC, and in other embodiments, the oligomeric phosphonates may have a Mw of from about 1,000 to about 15,000 g/mole as determined by $\eta_{rel}$ or GPC. The number average molecular weight (Mn), in such embodiments, may be from about 1,000 g/mole to about 10,000 g/mole, or from about 1,000 g/mole to about 5,000 g/mole, and in certain embodiments the Mn may be greater than about 1,200 g/mole. The narrow molecular weight distribution (i.e., Mw/Mn) of such oligomeric phosphonates may be from about 1 to about 7 in some embodiments and from about 1 to about 5 in other embodiments. In still other embodiments, the co-oligo(phosphonate carbonate)s may have a relative viscosity ($\eta_{rel}$) of from about 1.01 to about 1.20. Without wishing to be bound by theory, the relatively high molecular weight and narrow molecular weight distribution of the oligomeric phosphonates of the invention may impart a superior combination of properties. For example, the oligomeric phosphonates of embodiments are extremely flame retardant and exhibit superior hydrolytic stability and can impart such characteristics on a polymer combined with the oligomeric phosphonates to produce polymer compositions such as those described below. In addition, the oligomeric phosphonates of embodiments generally exhibit an excellent combination of processing characteristics including, for example, good thermal and mechanical properties.

Other embodiments are directed to methods for making such epoxy containing phosphonate monomers, polymers, copolymers, oligomers, and co-oligomers. The methods may vary among embodiments and can include any number of steps that can be carried out in any order. In some embodiments, the methods may include polymerizing epoxy containing monomers and phosphonate containing monomers in the presence of a sterically hindered non-nucleophilic base. In other embodiments, epoxy end groups may be added to any phosphonate containing oligomer or polymer by combining the phosphonate containing oligomer or polymer, one or more epoxy containing monomer, and a sterically hindered non-nucleophilic base under conditions that allow the epoxy containing monomer to be introduced onto hydroxyl end groups on the phosphonate containing oligomer or polymer.

In some embodiments, the epoxy containing phosphonate monomers, polymers, copolymers, oligomers, and co-oligomers may be prepared by the reaction scheme depicted below:

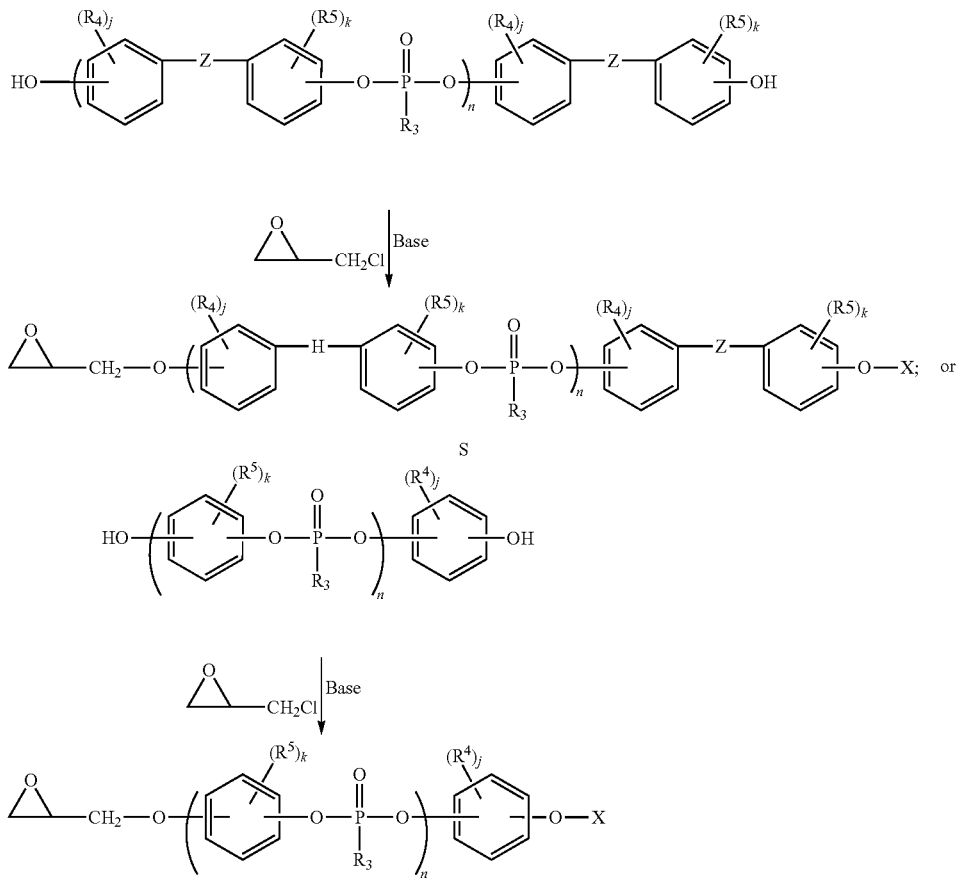

where $R_3$ can be $C_1$ to $C_{10}$ alkyl or $C_6$ to $C_{10}$ aryl or heteroaryl, each $R_4$ and $R_5$ can independently be a hydrogen, halogen atom, nitro group, cyano group, $C_1$-$C_{20}$ alkyl group, $C_4$-$C_{20}$ cycloalkyl group, or $C_6$-$C_{20}$ aryl containing group; j and k can independently be integers 1 to 4; and Z may be a bond, oxygen atom, sulfur atom, or $SO_2$ group for non-splittable bisphenols, and for splittable bisphenols Z may be the group, $R_6$—C—$R_7$, where $R_6$ and $R_7$ can independently be a hydrogen atom, lower alkyl $C_1$-$C_4$ alkyl group, aryl and substituted aryl. In some embodiments, $R_6$ and $R_7$ may combine to form a $C_4$-$C_{20}$ cycloaliphatic ring which is optionally substituted by one or more $C_1$-$C_{20}$ alkyl groups, aryl groups, or a combination of these; and X can be —H or

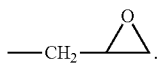

In such embodiments, n may be from 1 to about 1,000, and in various embodiments, n may be a single integer to signify a specific compound having a specific molecular weight, or n may be represented as a range signifying a combination of compounds of various lengths providing a molecular weight distribution.

Without wishing to be bound by theory, the sterically hindered non-nucleophilic base used in the methods of various embodiments may prevent hydrolysis of the phosphonate bond (P—O) in the oligomeric phosphonates, and co-oligomeric phosphonates, polyphosphonates, and co-polyphosphonates and other unwanted side reactions during polymerization. The addition of epoxy end groups on phosphonate containing compounds, oligomers, or polymers in the absence of a sterically hindered non-nucleophilic base typically results in a low molecular weight product or a product with an average molecular weight that is less than the average molecular weight for the pre-reacted phosphonate containing oligomer or polymer as a result of the hydrolysis of the phosphonate. In contrast, the methods of embodiments described herein allow for the epoxy terminated product to have substantially the same molecular weight as the pre-reacted phosphonate containing oligomer or polymer with no or substantially no generation of lower molecular weight products or phosphonic acid end groups. Accordingly, such methods allow for the efficient, high yield synthesis of epoxy containing phosphonate monomers, polymers, copolymers, oligomers and co-oligomers.

Steric hindrance occurs when the large size of groups within a molecule prevents chemical reactions that are observed in related molecules with smaller groups. The sterically hindered non-nucleophilic bases may contain electron donating groups with a bulky structure that can prevent chemical reactions that are observed in related molecules without such electron donating groups. An "electron donating group" as used herein refers to an atom or functional group covalently attached to, or otherwise associated with, the base that donates some of its electron density via resonance or inductive electron withdrawal. A wide variety of sterically hindered non-nucleophilic bases are known. Examples include but are not limited to N,N-diisopropylethylamine, 1,8-diazabicyclo[5,4,0]undec-7-ene, 1,5-diazabicyclo[4,3,0]non-5-ene, 1,5,7-triazabicyclo[4,4,0]dec-5-ene, 1,3-bis(2,4,6-trimethylphenyl)imidazol-2-ylidene, 1,3-bis(2,6-diisopropylphenyl)imidazol-2-ylidene, 1,3-diisopropylimidazol-2-ylidene, 1,3-bis(1-adamantyl)imidazol-2-ylidene, 1,3-dicyclohexylimidazol-2-ylidene, 1-butyl-3-methylimidzol-2-ylidene, 1,3-di-tert-butylimidzolin-2-ylidene, 1,3,4-triphenyl-1,2,4-triazol-5-ylidene, 2,6-di-tert-butylpyridine, 2,3,5-trimethylpyridine, lithium diisopropylamide, sodium bis(trimethylsilyl)amide, potassium bis(trimethylsilyl)amide, lithium 2,2,6,6-tetramethylpiperidide, sodium tert-butoxide, potassium tert-butoxide, potassium carbonate, cesium carbonate, and the like and combinations thereof. The bases may be added in a molar amount of 0.5 to 1.5 equivalent to the molar amount of hydroxyl groups present in the phosphonate containing monomers, oligomers or polymers.

The nucleophilic base can be added to the phosphonate containing monomer, oligomer or polymer, followed by adding the epichlorohydrin. Alternatively, the nucleophilic base can be added to a mixture of the phosphonate containing monomer, oligomer, or polymer and the epichlorohydrin, where the phosphonate containing monomer, oligomer, or polymer and epichlorohydrin have been allowed to react with each other for 10 minutes to 2 hours.

Such methods may be carried out in a solvent, and in particular embodiments, the solvent may be a polar aprotic solvent. A "polar aprotic solvent" as used herein refers to a solvent that can accept hydrogen bonds but lacks an acidic hydrogen. Polar aprotic solvents, generally, have an intermediate dielectric constant about 6 to about 50 and an intermediate polarity with a dipole moment of about 1.75 D to about 3.75 D. In certain embodiments, the polar aprotic solvent may be, for example, tetrahydrofuran, acetone, methyl acetate, ethyl acetate, petrol ether, dimethylsulfoxide, N,N-dimethyl formamide, and the like or combinations thereof. The total solids content in the reaction mixture can vary between 5 to 80%. The total solids content is calculated as the total weight of the phosphonate containing monomer, oligomer, or polymer, the sterically hindered nucleophilic base, and the epichlorohydrin divided by the total weight of the reaction mixture.

In some embodiments, the reaction may be carried out at a temperature of about 20° C. to about 180° C., or in other embodiments, about 30° C. to about 160° C. The reactions can be carried out at a relative humidity (RH) of 0-95%, in other embodiments from 20-80%, or in other embodiments from 30-50%. The reaction time may vary among and may depend, for example, on the starting materials. For example, the reaction may be carried out for from about 20 minutes to about 15 hours. The methods may be carried out under basic condition. For example, a pH of about 7 to 14 can be maintained throughout the reaction. In some embodiments, the method may include the step of measuring the pH during the reaction and adjusting the pH to maintain a constant pH during the reaction. In some embodiments, the method may include the step of terminating the reaction by adding an acid to neutralize the remaining base. Any acid can be used in embodiments, and in certain embodiments the acid may be a hydrochloric acid, sulfuric acid, nitric acid, phosphoric acid, phosphonic acid, and the like or combinations thereof.

The phosphonate containing monomers, oligomers, and polymers can be derived from any source including various commercially available phosphonate containing monomers, oligomers, and polymers. In some embodiments, the phosphonate containing monomers, oligomers and polymers may be hydroxyl containing phosphonate monomers, linear, branched and hyperbranched phosphonate polymers, copolymers, oligomers, or co-oligomers. Such compounds can be prepared by any method. For example, in some embodiments, a phosphodiester can be combined with an aromatic diol, such as a bisphenol, and a transesterification catalyst and heated until condensation is complete. A representation of this chemistry is shown below:

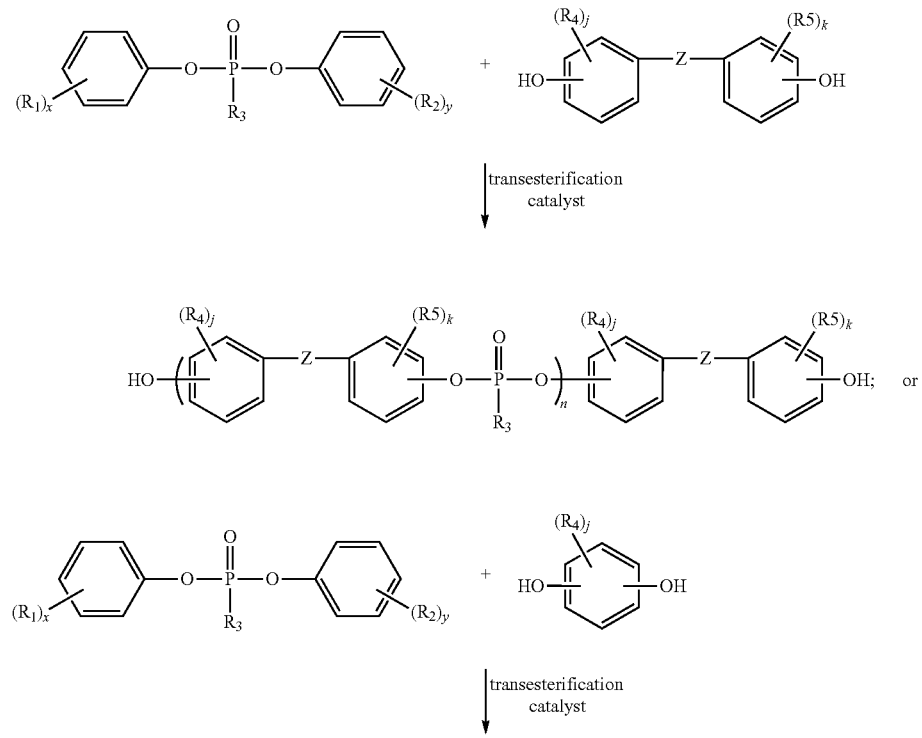

-continued

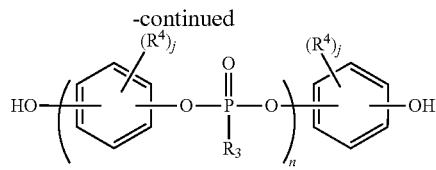

where each $R_1$ and $R_2$ can independently be a hydrogen or $C_1$-$C_4$ alkyl; x and y are independently integers of 1 to 5; $R_3$ can be $C_1$ to $C_{10}$ alkyl or $C_6$ to $C_{10}$ aryl or heteroaryl. In some embodiments, the phosphonic acid diaryl ester may be methylphosphonic acid diaryl ester or methyldiphenoxyphosphine oxide or diphenylmethyl phosphonate where $R_3$ is methyl. Each $R_4$ and $R_5$ can independently be a hydrogen, halogen atom, nitro group, cyano group, $C_1$-$C_{20}$ alkyl group, $C_4$-$C_{20}$ cycloalkyl group, or $C_6$-$C_{20}$ aryl containing group; j and k can independently integers 1 to 4; and Z may be a bond, oxygen atom, sulfur atom, or $SO_2$ group for non-splittable bisphenols, and for splittable bisphenols Z may be the group, $R_6$—C—$R_7$, where $R_6$ and $R_7$ can independently be a hydrogen atom, lower alkyl $C_1$-$C_4$ alkyl group, aryl and substituted aryl. In some embodiments, $R_6$ and $R_7$ may combine to form a $C_4$-$C_{20}$ cycloaliphatic ring which is optionally substituted by one or more $C_1$-$C_{20}$ alkyl groups, aryl groups, or a combination of these. In such embodiments, n may be from 1 to about 1000, and in various embodiments, n may be a single integer to signify a specific compound having a specific molecular weight, or n may be represented as a range signifying a combination of compounds of various lengths providing a molecular weight distribution.

Various aromatic dihydroxy compounds or bisphenols may be used alone or in combination with one another to form hydroxyl containing phosphonate monomers, linear, branched and hyperbranched phosphonate polymers, copolymers, oligomers or co-oligomers for use in embodiments of the invention. In certain embodiments, one or more bisphenols may be used to prepare the hydroxyl containing phosphonate monomers, linear, branched and hyper-branched phosphonate polymers, copolymers, oligomers or co-oligomers used in the embodiments of this invention. These bisphenols may include, but are not limited to 2,2-bis(4-hydroxyphenyl)propane (bisphenol A), 4,4'-dihydroxybiphenyl, 1,1-bis(4-hydroxyphenyl)-3,3-dimethyl-5-methyl cyclohexane (TMC bisphenol), 4,4' dihydroxydiphenylsulfone, 4,4'-dihydroxydiphenyl ether, 4,4'-dihydroxydiphenyl sulfide, resorcinol, hydroquinone, and methylhydroquinone, 2,2-bis(4-hydroxy-3-methylphenyl)propane, 2,2-bis(3-chloro-4-hydroxyphenyl)propane, 2,2-bis(3-bromo-4-hydroxyphenyl)propane, 2,2-bis(4-hydroxy-3-isopropylphenyl)propane, 1,1-bis(4-hydroxyphenyl)cyclohexane, 1,1-bis(4-hydroxy-3-methylphenyl)cyclohexane, 9,9-dihydroxy-diphenylfluorene, or a combination these.

The reaction scheme above describes synthesis of a linear hydroxyl containing phosphonate monomer, polymer, copolymer, oligomer or co-oligomer. Branched and hyper-branched variations of such compounds can be synthesized by introducing one or more branching agents into the reaction mixture. Suitable branching agents to prepare branched and hyperbranched hydroxyl containing phosphonate monomers, linear, branched and hyperbranched phosphonate polymers, copolymers, oligomers or co-oligomers are known and include a variety of phosphonate compounds with more than two phenoxy substituents, and a variety of phenol compounds with more than two phenolic groups. In other embodiments, a branching agent may be produced in-situ by providing a bisphenol that is splittable such as, for example, bisphenol A.

The concentration of hydroxy groups based on the total number of termini in the phosphonate monomers, linear, branched and hyperbranched phosphonate polymers, copolymers, oligomers or co-oligomers used in embodiments may be high. For example, they may have a percentage of the total number of termini having hydroxy end groups of from about 50% to 100%, about 85% to about 99%, or about 90% to about 98%. In other embodiments, greater than 90% of the total termini of the phosphonate monomers, linear, branched and hyperbranched phosphonate polymers, copolymers, oligomers or co-oligomers may have a hydroxyl group.

The epoxy containing phosphonate monomers, polymers, copolymers, oligomers and co-oligomers described above can subsequently be reacted with themselves using a catalyst or with a wide variety of curing agents to make fire resistant epoxy derived polymers. Suitable curing agents may be any monomers, oligomers, copolymers or co-oligomers that contain one or more functional groups that react with the epoxide ring system. These functional groups may include but are not limited to amines, phenols, anhydrides, thiols, alcohols, organic carboxylic acids and salts, acyl chlorides, aldehydes, ketones, Grignard reagents, water, sodium hydroxide, inorganic acids and their salts or combinations thereof. The groups may be present in a terminal, pendant or backbone configuration or combinations thereof. Specific examples of catalysts and curing agents include, but are not limited to, diethylenetriamine, triethylenetetramine, poly(oxypropylenediamine), poly(oxypropylenetriamine), poly(glycolamine), aminoethylpiperazine, isophrone diamine, 1,2-diaminocyclohexane, bis(4-aminocyclohexyl)methane, 4,4'-diaminodiphenylmethane, 4,4'-diaminophenylsulfone, m-phenylenediamine, diethyltoluenediamine, m-xylenediamine, 1,3-bis(aminoethylcyclohexane), dicyandiamide, hexahydrophthalic anhydride, and the like or combinations thereof.

Other embodiments of the invention are directed to polymer compositions including at least one epoxy containing phosphonate monomer, polymer, copolymer, oligomer and co-oligomer and at least one polymer or second oligomer or monomer, and optionally at least one curing agent. Such compositions are referred to herein as "polymer compositions." The at least one polymer or second oligomer or monomer may be any commodity or engineering plastic, and such polymer compositions can be produced by blending, mixing, or compounding the constituent polymers and oligomers. "Engineering plastics" as used herein include, both thermoplastics and thermosetting resins and may include, but are not limited to, polycarbonates, epoxy derived polymers, polyepoxies (e.g., polymers resulting from the reaction of one or more epoxy monomer or oligomer with one or more chain extender or curing agent such as a mono or multifunctional phenol, amine, benzoxazine, anhydride or combination thereof), benzoxazines, phenol formaldehyde derived polymers, polyacrylates, polyacrylonitriles, polyesters, such as, poly(ethylene terephthalate), poly(trimethylene terephthalate), and poly(butylene terephthalate), poly (lactic acid), unsaturated polyesters, polyamides, polystyrenes including high impact strength polystyrene, polyureas, polyurethanes, polyphosphonates, polyphosphates, poly(acrylonitrile butadiene styrene)s, block copolymers derived from styrene, isoprene, acrylonitrile, and butadiene, and ethylene vinyl acetate, polymers derived from phenol formaldehyde condensation, polyimides, polyarylates, poly(arylene ether)s, polyethylenes, polypropylenes, polyphenylene sulfides, poly(vinyl ester)s, polyvinyl chlorides, bismaleimide polymers, polyanhydrides, liquid crystalline polymers, cellulose polymers, or any combination thereof. The polymer or second oligomer may, therefore, include, or partially include one or more polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly (vinyl ester), polyvinyl chloride, bismaleimide polymer, polyanhydride, liquid crystalline polymer, polyether, polyphenylene oxide, cellulose polymer, benzoxazine, a hydrolytically stable polyphosphonate, and the like and combinations of these. In some embodiments, the polymer or second oligomer or monomer may contain functional groups that are capable of chemically reacting with the epoxy groups of the novel epoxy containing phosphonate monomers, polymers, copolymers, oligomers and co-oligomers of embodiments. The optional curing agent may include any molecule, polymer or oligomer that possesses a mono or multifunctional group capable of chemically reacting with an epoxide.

Embodiments of the invention are directed to compositions comprising epoxy containing phosphonate monomers, polymers, copolymers, oligomers and co-oligomers and provide a method for their synthesis, for reacting them to produce polymers, and articles of manufacture therefrom with inherent fire resistance. In addition, the compositions comprising epoxy containing phosphonate monomers, polymers, copolymers, oligomers and co-oligomers can be used in combination with other monomers, polymers or oligomers, and optionally a curing agent, to fabricate articles of manufacture with inherent fire resistance.

The novel epoxy containing phosphonate polymers, copolymers, oligomers and co-oligomers of such embodiments may be linear or branched, and in certain embodiments, may be hyperbranched. In general, the concentration of reactive epoxy groups based on the total number of termini for the oligomeric or co-oligomeric phosphonates may be high. For example, oligomeric phosphonates or co-oligomers may have a percentage of the total number of termini having epoxy end groups of from about 20% to 100%, about 85% to about 99%, or about 90% to about 98%. In other embodiments, greater than 90% of the total termini of the oligomeric phosphonate may have an epoxide end group.

For simplicity, throughout this disclosure, the terms, "phosphonate oligomers and co-oligomers" and the like are to be construed as referring to any type of oligomer described herein including oligophosphonates, random or block co-oligo(phosphonate ester)s, and random or block co-oligo(phosphonate carbonate)s. Such oligomers encompassed by these terms can be linear, lightly branched, indicating a relatively small number of branches, for example, 1 to about 5 branches per oligomer, or hyperbranched, indicating a relatively high number of branches, for example, greater than 5. Embodiments of the invention are not limited by the type of oligophosphonate, co-oligo (phosphonate ester), or co-oligo(phosphonate carbonate).

In some embodiments, the novel epoxy containing phosphonate monomers, polymers, copolymers, oligomers and co-oligomers can be combined with another epoxy containing resin. Any epoxy resin can be used in such embodiments, and in certain embodiments, the resin may contain glycidyl groups, alicyclic epoxy groups, oxirane groups, ethoxyline groups, or similar epoxy groups or combinations thereof that can react with epoxy groups associated with the epoxy containing phosphonate polymers, copolymers, oligomers and co-oligomers of this invention. Such epoxy resins are well known in the art and include, but are not limited to, novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylol-propane type epoxy resin, terpene-modified epoxy resin, linear aliphatic epoxy resin obtained by oxidizing olefin bonds with peracetic acid or a similar peracid, alicyclic epoxy resin, or sulfur-containing epoxy resin. In some embodiments, the epoxy resin may be composed of two or more epoxy resins of any of the aforementioned types. In particular embodiments, the epoxy resins may be aralkyl-type epoxy resins, such as epoxy resins derived from bisphenol A or 4,4'-methylene dianiline. The epoxy may also contain one or more additional components such as, for example, a benzoxazine compound or resin, and in some embodiments, the novel epoxy containing phosphonate monomers, polymers, copolymers, oligomers and co-oligomers may be used as epoxy modifiers, chain extenders or crosslinkers for epoxy resins, or epoxy hardeners in such epoxy resin polymer compositions.

In some embodiments the polymer compositions and other formulations described here may further include additives, fillers, and fibers, such as, but not limited to, chopped or continuous glass fiber, metal fibers, aramid fibers, carbon fibers, or ceramic fibers, surfactants, organic binders, polymeric binders, crosslinking agents, diluents, coupling agents, flame retardant agents, anti-dripping agents such as fluorinated polyolefins, silicones, and, lubricants, mould release agents such as pentaerythritol tetrastearate, nucleating agents, anti-static agents such as conductive blacks, carbon nanotubes, graphite, graphene, oxidized graphene, and organic antistatics such as polyalkylene ethers, alkylsulfonates, perfluor sulfonic acid, perfluorbutane, sulfonic acid potassium salt, and polyamide-containing polymers, catalysts, colorants, inks, dyes, antioxidants, stabilizers, and the like and any combinations thereof. In such embodiments, the one or more additional components or additives may make up from about 0.001 wt. % to about 1 wt. %, about 0.005 wt. % to about 0.9 wt. %, about 0.005 wt. % to about 0.8 wt. %, about 0.04 wt. % to about 0.8 wt. %, and in particular embodiments, from about 0.04 wt. % to about 0.6 wt. % based on the total composition. In other embodiments, additional components such as glass fiber, carbon fiber, organic fiber, ceramic fiber or other fillers may be provided at much higher concentrations up to 70 volume (vol.) %. For example, in some embodiments the novel epoxy containing phosphonate monomers, polymers, copolymers, oligomers and co-oligomers and polymers therefrom, or polymer compositions may include up to about 70 vol. % glass fiber, carbon fiber, organic fiber or ceramic fiber, and in other embodiments, they may include from about 5 vol. % to about 70 vol. %, from about 10 vol. % to about 60 vol. %, or about 20 vol. % to about 50 vol. % glass fiber, carbon fiber, organic fiber or ceramic fiber.

Polymer compositions including novel epoxy containing phosphonate monomers, polymers, copolymers, oligomers and co-oligomers and other engineering polymers and/or additional components or additives can be prepared by conventional means. For example, in some embodiments, the respective constituents can be mixed in a known manner and subjected to melt compounding and/or melt extrusion at temperatures of about 20° C. to about 400° C. in customary equipment such as internal kneaders, extruders, or twin-screw apparatuses. Mixing the individual constituents can be affected either successively or simultaneously and either at about room temperature (about 20° C.) or at higher temperature. For example, in some embodiments, the engineering plastic and/or all additional components or additives can be introduced into the novel epoxy containing phosphonate monomers, polymers, copolymers, oligomers and co-oligomers, by compounding. In other embodiments, the individual constituents can be introduced separately in different stages of the preparation process into a melt. Additional additives can be introduced at any point during the mixing process.

The form of addition of the compounds according to the invention is not limited. For example, the engineering plastics and/or additional components or additives can be added as solids such as a powder, as concentrate in solution or as a liquid.

The novel epoxy containing phosphonate monomers, polymers, copolymers, oligomers and co-oligomers and polymers therefrom, as well as polymer compositions of various embodiments can be used in any application in which a flame retardant polymer is useful. For example, in some embodiments, the polymer compositions of the invention may be used as coatings on plastics, metals, glass, carbon, ceramic, or wood products which can be in a variety of forms, for example as a fiber, woven mat, nonwoven mat, cloth, broadgood, fabric, molding, laminate, foam, extruded shape or the like, and in other embodiments, the polymer compositions of the invention can be used in adhesives or to fabricate sheets, multilayer sheets, free-standing films, multi-layer films, fibers, foams, molded articles, and fiber reinforced composites. Such articles may be well-suited for applications requiring flame resistance. The novel epoxy containing phosphonate monomers, polymers, copolymers, oligomers and co-oligomers and polymers therefrom, and polymer compositions of the invention, may exhibit outstanding flame resistance and good melt processability making these materials useful in applications for the automotive, construction, and electronic sectors that require outstanding fire retardancy, high temperature performance, and melt processability. In addition, these articles may be well suited for a variety of applications as support parts, electrical components, electrical connectors, printed wiring laminated boards, flexible or rigid circuit boards, electrical or electromagnetic housings, electrical or electromagnetic subcomponents and components in consumer products that must meet UL or other standardized fire resistance standards and environmental standards.

In some embodiments, the novel epoxy containing phosphonate monomers, polymers, copolymers, oligomers and co-oligomers and polymers therefrom, and polymer compositions of the invention may be combined with other components or reinforcing materials. For example, in various embodiments, continuous or chopped glass fibers, carbon black or carbon fibers, ceramic particles or fibers, organic fibers, or other organic materials may be included in the polymers and polymer compositions of the invention. In particular embodiments, continuous or chopped glass fibers, carbon fibers, ceramic fibers, organic fibers, or other organic materials may be combined with the novel epoxy containing phosphonate monomers, polymers, copolymers, oligomers and co-oligomers and polymers therefrom, and polymer compositions of the invention to create a prepreg to prepare laminates. Such laminates may be used to fabricate components such as flexible or rigid laminated circuit boards that can be incorporated into articles of manufacture such as electronic goods such as, for example, televisions, computers, laptop computers, tablet computers, printers, cell phones, video games, DVD players, stereos and other consumer electronics.

The novel epoxy containing phosphonate monomers, polymers, copolymers, oligomers and co-oligomers and polymers therefrom, and polymer compositions of the invention are generally self-extinguishing, i.e., they stop burning when removed from a flame and any drops produced by melting in a flame stop burning are almost instantly extinguishes and do not readily propagate fire to any surrounding materials. Moreover, these polymer compositions do not evolve noticeable smoke when a flame is applied.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples. The following examples are for illustrative purposes only and are not to be construed as limiting the invention in any manner.

Analytical Characterization

Molecular weight distributions were determined by measuring 0.2% solutions of polymer or oligomer in tetrahydrofuran by gel permeation chromatography (GPC) with UV detection (at 254 nm). Calibration of the instrument was conducted with linear polystyrene (PS) standards of known molecular weights. The weight average (Mw), number average (Mn) and polydispersity (Mw/Mn), referred to as PD, were evaluated from the chromatograms by using WinGPC software.

Epoxy groups and hydroxyl groups were detected by $^1$H Nuclear Magnetic Resonance (NMR) spectroscopy using Bruker AM-300 spectrometer. The samples for analysis were prepared by dissolving about 10 mg of sample in about 0.7 ml of deuterated dimethylsulfoxide (DMSO-d6) solvent.

End-group analysis was performed using a Bruker Daltonics Reflex III Matrix Assisted Laser Desorption/Ionization Time-of-Flight (MALDI-TOF) instrument. The samples were prepared using dithranol as the matrix material, tetrahydrofuran (THF) as the solvent, and with no exogenous metal cation. The end-groups were determined by analysis of the peak molar mass (m/z) distribution obtained from the spectrum of each sample.

Hydroxyl numbers (mg KOH/g) were obtained by titration using the acetylation method. The oligomer sample is dissolved in the acetylating solution (acetic anhydride in dry pyridine). The catalyst (5% N-dimethylaminopyridine in dry pyridine) is then added and allowed to stir for 1 hour.

Deionized water is added and stirred for half an hour, before titrating with ethanolic potassium hydroxide to the end-point (change from yellow to blue color). Thymol blue is used as the indicator.

Epoxy values were obtained by titration using hydrobromic acid. 0.1 N hydrobromic acid in glacial acetic acid was used as a standard titrant. The epoxy sample is dissolved in 10 ml of glacial acid and is titrated by the 0.1 N hydrobromic acid solution, to a green color using two to three drops of methyl violet indicator. The solution will change from purple to dark, then light blue until obtaining the green color. The epoxy equivalent of epoxy resins is obtained as $$Epoxy equivalent = 1000 \frac{Weight of sample}{Normality of hydrobromic acid * volume of hydrobromic acid}$$

Materials

Phosphonate oligomers with a high level of termination with bis-hydroxy end-groups were synthesized via a two-stage melt condensation process. The first stage was carried out in a 12 L stainless steel reactor equipped with a mechanical stirrer and two reflux columns connected in series. In a typical reaction, 2,2-bis-(4-hydroxyphenyl) propane (BPA, 1,800 g, 7.895 mol), diphenyl methylphosphonate (DPP) (1305 g, 5.262 mol), and the catalyst, tetraphenylphosphonium phenolate (TPPP (30% phenol), 0.51 g, 0.83 mmol) were added to the reactor under nitrogen. The monomer/catalyst mixture was heated at 265° C. for 5 hours, with gradual reduction in the vacuum level to 10 mmHg. Both the top and bottom reflux columns were heated to 135° C. After 105 minutes, the temperature of the bottom column was increased to 150° C., and the top column decreased to 120° C. The phenol by-product was distilled off and collected in a graduated receiving flask. After 5 hours, the product was transferred via a stainless steel bridge to a 6 L stainless steel reactor held at 265° C. under nitrogen. At the start of the second stage, additional catalyst (2.55 g) was added to the reactor. The reaction was held at 265° C./10 mmHg for 2 hours, with the distillation column at 150° C. The distillation column temperature was then increased to 200° C. and full vacuum (<0.5 mmHg) applied for 1 hour. The product was extruded through the die at the bottom of the reactor into a liquid nitrogen bath and isolated as a coarse white powder (Tg 82° C., Mn/Mw 1,200/2,200 g/mole (GPC in THF against PS standards), —OH content 78 mg KOH/g). The end-group composition was determined using MALDI-TOF analysis. The amount of chains having reactive hydroxyl groups at both ends of the chain (expressed as bis-OH chains) was 91%.

Comparative Example 1

Under dry conditions (RH 24%), a three-necked Schlenk flask equipped with a reflux condenser and dropping funnel was charged with 10.0 g of the hydroxyl terminated phosphonate oligomer used in EXAMPLE 1 dissolved in 30 ml of ethanol and the dropping funnel was charged with 0.556 g of sodium hydroxide (13.9 mmol) in ethanol under a nitrogen atmosphere. The mixture in the reactor was heated with stirring to 60° C. and then 2.572 g (27.8 mmol) of epichlorohydrin was injected using a syringe. After maintaining the reaction mixture at 60° C. for 30 minutes, sodium hydroxide solution was added over a one hour period. The reaction solution was held at this temperature for two more hours and then cooled and the white solid was filtered off. The filtrate was concentrated, washed with the mixture of water and isopropanol (3:1). The extract was dried in the vacuum oven. GPC resulted in a Mn of 350 g/mol and a Mw of 980 g/mol.

Comparative Example 2

Under dry conditions (RH 27%), a three-necked Schlenk flask equipped with a reflux condenser and dropping funnel was charged with 10.0 g of the hydroxyl terminated phosphonate oligomer used in EXAMPLE 1 dissolved in 30 ml of THF under a nitrogen atmosphere. The mixture in the reactor was heated with stirring to 64° C. When the mixture reached 64° C., 2.572 g (27.8 mmol) of epichlorohydrin was injected using a syringe. After maintaining the reaction mixture at 60° C. for 30 minutes, 1.62 ml of 2,6-dimethylpyridine was added. The reaction solution was stirred and held at this temperature, and the reaction mixture appeared as a light yellow clear solution without any suspension or precipitate observed. After seven hours the reaction mixture was cooled and solvent was evaporated. The extract was washed with a mixture of water and isopropanol (3:1) and dried in the vacuum oven. GPC resulted in a Mn of 840 g/mol and a Mw of 1,800 g/mol. $^1$H NMR (in DMSO-d6) showed a sharp peak at 9.2 ppm indicative of terminal hydroxyl groups. There was no oxirane (epoxide) peak detected in the $^1$H NMR spectrum.

Comparative Example 3

Under dry conditions (RH 24%), a three-necked Schlenk flask equipped with a reflux condenser and dropping funnel was charged with 10.0 g of the hydroxyl terminated phosphonate oligomer used in EXAMPLE 1 dissolved in 30 ml of THF under a nitrogen atmosphere. The mixture in the reactor was heated with stirring to 64° C. When the mixture reached 64° C., 2.572 g (27.8 mmol) of epichlorohydrin was injected using a syringe. After maintaining the reaction mixture at 60° C. for 30 minutes, 3.67 g of triphenylphosphine in 10 ml of THF was added. The reaction solution was stirred and held at this temperature, and the reaction mixture appeared as a light yellow clear solution without any suspension or precipitate observed. After seven hours the reaction mixture was cooled and solvent was evaporated. The extract was washed with the mixture of water and isopropanol (3:1) and dried in the vacuum oven. GPC resulted in a Mn of 840 g/mol and a Mw of 1,800 g/mol w. $^1$H NMR (in DMSO-d6) showed a sharp peak at 9.2 ppm indicative of terminal hydroxyl groups. There was no oxirane (epoxy) peak detected in the $^1$H NMR spectrum.

Example 1

Synthesis of Diglycidyl Ether Terminated Phosphonate Oligomer

A hydroxyl terminated phosphonate oligomer was titrated by acetic anhydride, resulted in acid number of 78 mg KOH/g. The phosphonate oligomer exhibited a number average molecular weight (Mn) of 840 g/mol and a weight average molecular weight (Mw) of 1,780 g/mol by GPC based on a polystyrene calibration curve. $^1$H NMR (in DMSO-d6) showed a sharp peak at 9.2 ppm assigning terminal hydroxyl group. In dry condition (RH 27%), a three-necked Schlenk flask equipped with a reflux condenser and dropping funnel was charged with 10.0 g of the hydroxyl terminated phosphonate oligomer and 30 ml of dry tetrahydrofuran (THF) and 10 ml of ethylbenzene under a nitrogen atmosphere. The dropping funnel was charged with 2.05 g of lithium 2,2,6,6-tetramethylpiperidide dissolved in 10 ml of THF solution. The mixture in the reactor was heated with stirring to 60° C. and 2.572 g (27.8 mmol) of epichlorohydrin was subsequently injected into the flask using a syringe. After stirring at this temperature for 30 minutes, dropwise addition of the lithium 2,2,6,6-tetramethylpiperidide solution was initiated and continued for about one hour. After addition of the lithium 2,2,6,6-tetramethylpiperidide was complete, the reaction solution was stirred and held at 60° C. for five additional hours. During this time, the formation of a white suspension was observed. The reaction mixture was cooled and the white solid was removed by filtration, and the resulting filtrate was evaporated under vacuum at 80° C. leaving behind a considerable amount of non-volatile residue in the distillation flask. The remaining residue (light brown crystals) was washed with a mixture of water and isopropanol (3:1), dried to give 10.11 g of product. GPC analysis indicated a Mn of 867 g/mol and a Mw of 1,885 g/mol based on a polystyrene calibration curve. $^1$H NMR analysis of the product indicated all terminal hydroxyl groups reacted as evidenced by the disappearance of the peaks at 9.2 ppm and the formation of new peaks at 3.6 to 4.0 ppm. Titration for oxirane (epoxide) by hydrobromic acid consumption gave an epoxy value of 71% converted from hydroxyl groups.

Example 2

Synthesis of Diglycidyl Ether Terminated Phosphonate Oligomer

Under dry conditions (RH 24%), a three-necked Schlenk flask equipped with a reflux condenser and dropping funnel was charged with 10.0 g of dry hydroxyl terminated phosphonate oligomer used in EXAMPLE 1 and 30 ml of dry N,N-dimethylformamide (DMF) under a nitrogen atmosphere. The dropping funnel was charged with 2.05 g of lithium 2,2,6,6-tetramethylpiperidide dissolved in 10 ml of DMF solution. The mixture in the reactor was heated with stirring to 68° C. and 2.572 g (27.8 mmol) of epichlorohydrin was subsequently injected into the flask using a syringe. After stirring at this temperature for 30 minutes, dropwise addition of the 2.05 g of lithium 2,2,6,6-tetramethylpiperidide solution was initiated and continued for about one hour. After the base addition was complete, the reaction solution was stirred and held at 68° C. for two additional hours. During this time, the formation of a white suspension was observed. The white solid was removed by filtration, and the resulting filtrate was evaporated under vacuum at 80° C. leaving behind a considerable amount of non-volatile residue in the distillation flask. The remaining residue (light brown crystals) was washed with a mixture of water and isopropanol (3:1), dried to give 7.60 g of product. GPC analysis indicated a Mn of 870 g/mol and a Mw of 2,020 g/mol based on a polystyrene calibration curve. $^1$H NMR analysis of the product indicated all terminal hydroxyl groups reacted as evidenced by the disappearance of the peaks at 9.2 ppm and the formation of new peaks at 3.6 to 4.0 ppm. Titration for oxirane (epoxide) by hydrobromic acid consumption gave an epoxy value of 95%.

Example 3

Synthesis of Diglycidyl Ether Terminated Phosphonate Oligomer

A three-necked Schlenk flask equipped with a reflux condenser and dropping funnel was charged with 10.0 g of the hydroxyl terminated phosphonate oligomer used in EXAMPLE 1 and 10 ml of dry N,N-dimethylformamide (DMF) under a nitrogen atmosphere. The dropping funnel was charged with 1.336 g of sodium t-butoxide dissolved in 10 ml of DMF solution. The mixture in the reactor was heated with stirring to 65° C. and 2.572 g (27.8 mmol) of epichlorohydrin was subsequently injected into the flask using a syringe. After stirring at this temperature for 30 minutes, dropwise addition of the sodium t-butoxide solution was initiated and continued for about one hour. After addition of the sodium t-butoxide addition was complete, the reaction solution was stirred and held at 65° C. for two additional hours. During this time, the formation of a white suspension was observed and a relative humidity of 68% was recorded. The reaction mixture was cooled and a few drops of sodium phosphate monobasic solution were added to neutralize the product solution. The white solid was removed by filtration, and the resulting filtrate was evaporated under vacuum at 80° C. leaving behind a considerable amount of non-volatile residue in the distillation flask. The remaining residue (light brown crystals) was washed with a mixture of water and isopropanol (3:1), dried to give 10.79 g of product. GPC analysis indicated a Mn of 750 g/mol and a Mw of 1,680 g/mol based on a polystyrene calibration curve. $^1$H NMR analysis of the product indicated all terminal hydroxyl groups reacted as evidenced by the disappearance of the peaks at 9.2 ppm and the formation of new peaks at 3.6 to 4.0 ppm. Titration for oxirane (epoxide) by hydrobromic acid consumption gave an epoxy value of 87%.

Example 4

Synthesis of Diglycidyl Ether Terminated Phosphonate Oligomer

A three-necked Schlenk flask equipped with a reflux condenser and dropping funnel was charged with 10.0 g of the hydroxyl terminated phosphonate oligomer used in EXAMPLE 1 and 20 ml of dry tetrahydrofuran (THF) under a nitrogen atmosphere. The mixture in the reactor was heated with stirring to 60° C. and 1.20 g of sodium t-butoxide dissolved in 10 ml of THF was added to the reactor. 2.572 g of epichlorohydrin was subsequently injected into the flask using a syringe, and the reaction solution was stirred for seven hours. During this time, the formation of a white suspension was observed and a relative humidity of 60% was recorded. The reaction mixture was cooled and a few drops of sodium phosphate monobasic solution were added to neutralize the product solution. The white solid was removed by filtration, and the resulting filtrate was evaporated under vacuum at 80° C. leaving behind a considerable amount of non-volatile residue in the distillation flask. The remaining residue (light brown crystals) was washed with a mixture of water and isopropanol (3:1), dried to give 9.98 g of product. GPC analysis indicated a Mn of 870 g/mol and a Mw of 1,930 g/mol based on a polystyrene calibration curve. $^1$H NMR analysis of the product indicated all terminal hydroxyl groups reacted as evidenced by the disappearance of the peaks at 9.2 ppm and the formation of new peaks at 3.6 to 4.0 ppm. Titration for oxirane (epoxide) by hydrobromic acid consumption gave an epoxy value of 63%.

Example 5

Synthesis of Diglycidyl Ether Terminated Phosphonate Oligomer

Under dry conditions (RH 25%), a three-necked Schlenk flask equipped with a reflux condenser and dropping funnel was charged with 10.0 g of the hydroxyl terminated phosphonate oligomer used in EXAMPLE 1 in 10 ml of dry DMF and 10 ml of dry THF. The mixture in the reactor was heated with stirring to 55° C. and then 1.560 g of potassium t-butoxide (13.9 mmol) in 15 ml of DMF was injected to the reactor, followed by the addition of 2.572 g (27.8 mmol) of epichlorohydrin using a syringe. The reaction mixture was stirred and held at this temperature for seven hours and then was cooled. The white solid precipitate was filtered off. The filtrate was concentrated and washed with a mixture of water and isopropanol (3:1). The extract was dried in a vacuum oven and yielded 10.3 g of oligomer with a Mn of 830 g/mol and a Mw of 1,850 g/mol. Titration for oxirane (epoxide) by hydrobromic acid consumption gave an epoxy value of 68%.

Example 6

Synthesis of Diglycidyl Ether Terminated Phosphonate Oligomer

A three-necked Schlenk flask equipped with a reflux condenser and dropping funnel was charged with 10.0 g of the hydroxyl terminated phosphonate oligomer used in EXAMPLE 1 dissolved in 30 ml of dry tetrahydrofuran (THF) and the dropping funnel was charged with 1.726 g (or 1.72 ml) of 1,5-diazobicyclio[4,3,0]non-5-ene (13.9 mmol) under a nitrogen atmosphere. The mixture in the reactor was heated with stirring to 64° C. and 2.572 g (27.8 mmol) of epichlorohydrin was injected using a syringe. After maintaining the reaction mixture at 64° C. for 30 minutes, 1,5-diazobicyclio[4,3,0]non-5-ene solution was added over a one hour period. The reaction solution was stirred and held at this temperature for three more hours, then cooled and the white solid was filtered off. The filtrate was concentrated, washed with a mixture of water and isopropanol (3:1). The extract was dried in a vacuum oven and yielded 10.5 g. GPC resulted in an Mn of 700 g/mol and a Mw of 1,620 g/mol. Titration for oxirane (epoxide) by hydrobromic acid consumption gave an epoxy value of 75%.

The invention claimed is:

1. A compound of Formula I:

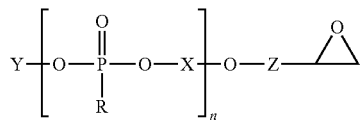

I wherein:

R is $C_1$ to $C_{20}$ alkyl, $C_1$ to $C_{20}$ alkenyl, $C_1$ to $C_{20}$ alkynyl, substituted $C_1$ to $C_{20}$ alkyl, substituted $C_1$ to $C_{20}$ alkenyl, substituted $C_1$ to $C_{20}$ alkynyl, $C_3$ to $C_{20}$ cycloalkyl, substituted $C_3$ to $C_{20}$ cycloalkyl, $C_6$ to $C_{20}$ aryl, $C_6$ to $C_{20}$ heteroaryl, substituted $C_6$ to $C_{20}$ aryl, or substituted $C_6$ to $C_{20}$ heteroaryl;

X is $C_1$ to $C_{20}$ alkylene, $C_1$ to $C_{20}$ alkenylene, $C_1$ to $C_{20}$ alkynylene, substituted $C_1$ to $C_{20}$ alkylene, substituted $C_1$ to $C_{20}$ alkenylene, substituted $C_1$ to $C_{20}$ alkynylene, $C_3$ to $C_{20}$ cycloalkylene, substituted $C_3$ to $C_{20}$ cycloalkylene, $C_6$ to $C_{20}$ arylene, $C_6$ to $C_{20}$ heteroarylene, or substituted $C_6$ to $C_{20}$ heteroarylene;

Y is X—OH or X—O—Z-epoxy, $C_6$ to $C_{20}$ arylene, $C_6$ to $C_{20}$ heteroarylene, substituted $C_6$ to $C_{20}$ arylene, substituted $C_6$ to $C_{20}$ heteroarylene, carboxyl, amine, vinyl, or isocyanate;

Z is $C_1$ to $C_{20}$ alkylene, $C_1$ to $C_{20}$ alkenylene, $C_1$ to $C_{20}$ alkynylene, substituted $C_1$ to $C_{20}$ alkylene, substituted $C_1$ to $C_{20}$ alkenylene, or substituted $C_1$ to $C_{20}$ alkynylene; and n is an integer from 2 to 1000; and wherein the compound has a weight average molecular weight of from about 5,000 g/mole to about 10,000 g/mole as determined by gel permeation chromatography based on polystyrene calibration.

2. The compound of claim 1, wherein R is $C_1$ to $C_{10}$ alkyl, $C_6$ to $C_{10}$ aryl, or $C_6$ to $C_{10}$ heteroaryl.

3. The compound of claim 1, wherein R is methyl.

4. The compound of claim 1, wherein X is $C_6$ to $C_{20}$ arylene, $C_6$ to $C_{20}$ heteroarylene, or substituted $C_6$ to $C_{20}$ heteroarylene.

5. The compound of claim 1, wherein —O—X—O— is derived from hydroquinone, resorcinol, 4,4'-biphenol, bisphenol A, bisphenol F, 4,4'-thiodiphenol, 4,4'-sulfonyldiphenol, or combinations thereof.

6. The compound of claim 1, wherein Z is $C_1$ to $C_5$ alkylene.

7. The compound of claim 1, wherein Z is methylene.

8. The compound of claim 1, having a structure of Formulae III, IIIa, or IIIb:

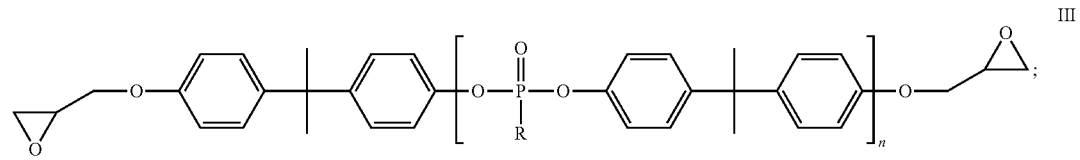

III

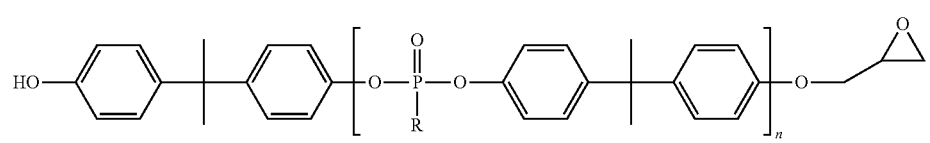

IIIa

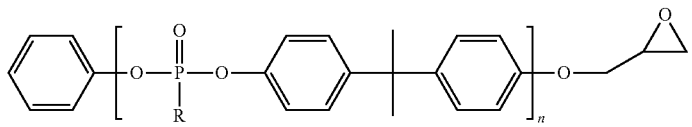

IIIb wherein each R is, independently, $C_1$ to $C_{10}$ alkyl, $C_6$ to $C_{10}$ aryl, or $C_6$ to $C_{10}$ heteroaryl and each n is, independently, 2 to 20.

9. A composition comprising a compound of Formula I:

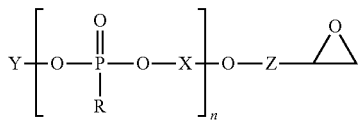

I wherein:
- each R is, independently, $C_1$ to $C_{20}$ alkyl, $C_1$ to $C_{20}$ alkenyl, $C_1$ to $C_{20}$ alkynyl, substituted $C_1$ to $C_{20}$ alkyl, substituted $C_1$ to $C_{20}$ alkenyl, substituted $C_1$ to $C_{20}$ alkynyl, $C_3$ to $C_{20}$ cycloalkyl, substituted $C_3$ to $C_{20}$ cycloalkyl, $C_6$ to $C_{20}$ aryl, $C_6$ to $C_{20}$ heteroaryl, substituted $C_6$ to $C_{20}$ aryl, or substituted $C_6$ to $C_{20}$ heteroaryl;
- each X is, independently, $C_1$ to $C_{20}$ alkylene, $C_1$ to $C_{20}$ alkenylene, $C_1$ to $C_{20}$ alkynylene, substituted $C_1$ to $C_{20}$ alkylene, substituted $C_1$ to $C_{20}$ alkenylene, substituted $C_1$ to $C_{20}$ alkynylene, $C_3$ to $C_{20}$ cycloalkylene, substituted $C_3$ to $C_{20}$ cycloalkylene, $C_6$ to $C_{20}$ arylene, $C_6$ to $C_{20}$ heteroarylene, or substituted $C_6$ to $C_{20}$ heteroarylene;
- each Y is, independently, X—OH or X—O—Z-epoxy, $C_6$ to $C_{20}$ arylene, $C_6$ to $C_{20}$ heteroarylene, substituted $C_6$ to $C_{20}$ arylene, substituted $C_6$ to $C_{20}$ heteroarylene, carboxyl, amine, vinyl, or isocyanate;
- each Z is, independently, $C_1$ to $C_{20}$ alkylene, $C_1$ to $C_{20}$ alkenylene, $C_1$ to $C_{20}$ alkynylene, substituted $C_1$ to $C_{20}$ alkylene, substituted $C_1$ to $C_{20}$ alkenylene, or substituted $C_1$ to $C_{20}$ alkynylene; and
- each n is, independently, an integer from 2 to 1000; and
- wherein the compound has a weight average molecular weight of from about 5,000 g/mole to about 10,000 g/mole as determined by gel permeation chromatography based on polystyrene calibration.

10. The composition of claim 9, wherein at least about 20% of the compound in the composition comprises two or more epoxy end groups.

11. The composition of claim 9, wherein at least about 80% of the compound in the composition comprises two or more epoxy end groups.

12. The composition of claim 9, wherein the composition exhibits a V0 rating according the UL94 protocol at a thickness of 0.2 mm or higher.

13. The composition of claim 9, further comprising one or more epoxy resins selected from the group consisting of novolac-type epoxy resins, cresol-novolac epoxy resins, triphenolalkane-type epoxy resins, aralkyl-type epoxy resins, aralkyl-type epoxy resins having a biphenyl skeleton, biphenyl-type epoxy resins, dicyclopentadiene-type epoxy resins, heterocyclic-type epoxy resins, epoxy resins containing a naphthalene ring, bisphenol-A type epoxy compounds, a bisphenol-F type epoxy compounds, stilbene-type epoxy resins, trimethylol-propane type epoxy resins, terpene-modified epoxy resins, linear aliphatic epoxy resins obtained by oxidizing olefin bonds with peracetic acid or peracid, alicyclic epoxy resins, sulfur-containing epoxy resins, and combinations thereof.

14. The composition of claim 13, wherein the composition comprises one or more compounds of Formula I that have reacted with the one or more epoxy resins.

15. The composition of claim 9, further comprising one or more additional components selected from the group consisting of additives, fillers, fibers, chopped glass fibers, continuous glass fiber, metal fibers, aramid fibers, carbon fibers, ceramic fibers, surfactants, organic binders, polymeric binders, crosslinking agents, diluents, coupling agents, flame retardant agents, anti-dripping agents, fluorinated polyolefins, silicones, lubricants, mold release agents, pentaerythritol tetrastearate, nucleating agents, anti-static agents, conductive blacks, carbon nanotubes, graphite, graphene, oxidized graphene, organic antistatics, polyalkylene ethers, alkylsulfonates, perfluor sulfonic acid, perfluorbutane, sulfonic acid potassium salt, polyamide-containing polymers, catalysts, colorants, inks, dyes, antioxidants, stabilizers, and combinations thereof.

16. The composition of claim 9, wherein the one or more additional components make up from about 0.001 wt. % to about 1 wt. % of the composition.

17. The composition of claim 9, wherein the one or more additional components comprise fillers, fibers, chopped glass fibers, continuous glass fiber, metal fibers, aramid fibers, carbon fibers, or ceramic fibers and make up about 5 vol. % to about 70 vol. % of the composition.

18. A method for making an epoxy terminated phosphonate containing oligomer or polymer comprising:
- combining a phosphonate containing polymer, copolymer, oligomer or co-oligomer having a weight average molecular weight of from about 5,000 g/mole to about 15,000 g/mole as determined by gel permeation chromatography based on polystyrene calibration, an epoxy containing monomer, and sterically hindered non-nucleophilic base; and
- reacting the phosphonate containing polymer, copolymer, oligomer or co-oligomer with the epoxy containing monomer.

19. A method of claim 18, in which the molecular weight of the phosphonate containing monomer, polymer, copolymer, oligomer or co-oligomer after reaction with the epoxy containing monomer is at least 90% of the original value.

20. A method of claim 18, wherein the sterically hindered non-nucleophilic base is selected from the group consisting of N,N-diisopropylethylamine, 1,8-diazabicyclo[5,4,0]undec-7-ene, 1,5-diazabicyclo[4,3,0]non-5-ene, 1,5,7-triazabicyclo[4,4,0]dec-5 ene, 1,3-bis(2,4,6-trimethylphenyl)imidazol-2-ylidene, 1,3-bis(2,6-diisopropylphenyl)imidazol-2-ylidene, 1,3-diisopropylimidazol-2-ylidene, 1,3-bis(1-adamantyl)imidazol-2-ylidene, 1,3-dicyclohexylimidazol-2-ylidene, 1-butyl-3-methylimidzol-2-ylidene, 1,3-di-tert-butylimidzolin-2-ylidene, 1,3,4-triphenyl-1,2,4-triazol-5- ylidene, 2,6-di-tert-butylpyridine, 2,3,5-trimethylpyridine, lithium diisopropylamide, sodium bis(trimethylsilyl)amide, potassium bis(trimethylsilyl)amide, lithium 2,2,6,6-tetramethylpiperidide, sodium tert-butoxide, potassium tert-butoxide, potassium carbonate, cesium carbonate, and combinations thereof.

21. An article of manufacture comprising a composition having a compound of Formula I:

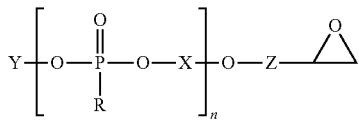

wherein:
   each R is, independently, $C_1$ to $C_{20}$ alkyl, $C_1$ to $C_{20}$ alkenyl, $C_1$ to $C_{20}$ alkynyl, substituted $C_1$ to $C_{20}$ alkyl, substituted $C_1$ to $C_{20}$ alkenyl, substituted $C_1$ to $C_{20}$ alkynyl, $C_3$ to $C_{20}$ cycloalkyl, substituted $C_3$ to $C_{20}$ cycloalkyl, $C_6$ to $C_{20}$ aryl, $C_6$ to $C_{20}$ heteroaryl, substituted $C_6$ to $C_{20}$ aryl, or substituted $C_6$ to $C_{20}$ heteroaryl;
   each X is, independently, $C_1$ to $C_{20}$ alkylene, $C_1$ to $C_{20}$ alkenylene, $C_1$ to $C_{20}$ alkynylene, substituted $C_1$ to $C_{20}$ alkylene, substituted $C_1$ to $C_{20}$ alkenylene, substituted $C_1$ to $C_{20}$ alkynylene, $C_3$ to $C_{20}$ cycloalkylene, substituted $C_3$ to $C_{20}$ cycloalkylene, $C_6$ to $C_{20}$ arylene, $C_6$ to $C_{20}$ heteroarylene, or substituted $C_6$ to $C_{20}$ heteroarylene;
   each Y is, independently, X—OH or X—O—Z-epoxy, $C_6$ to $C_{20}$ arylene, $C_6$ to $C_{20}$ heteroarylene, substituted $C_6$ to $C_{20}$ arylene, substituted $C_6$ to $C_{20}$ heteroarylene, carboxyl, amine, vinyl, or isocyanate;
   each Z is, independently, $C_1$ to $C_{20}$ alkylene, $C_1$ to $C_{20}$ alkenylene, $C_1$ to $C_{20}$ alkynylene, substituted $C_1$ to $C_{20}$ alkylene, substituted $C_1$ to $C_{20}$ alkenylene, or substituted $C_1$ to $C_{20}$ alkynylene; and
   each n is, independently, an integer from 2 to 1000; and
      wherein the compound has a weight average molecular weight of from about 5,000 g/mole to about 10,000 g/mole as determined by gel permeation chromatography based on polystyrene calibration.

22. The article of manufacture of claim 21, wherein the article is selected from the group consisting of electrical support parts, electrical components, electrical connectors, printed wiring laminated boards, electrical housings, electromagnetic housings, electrical subcomponents, electromagnetic subcomponents, flexible or rigid circuit boards, flexible or rigid laminated circuit boards, electronic goods, televisions, computers, laptop computers, tablet computers, printers, cell phones, video games, DVD players, stereos, and consumer electronics and components in consumer products.

23. The article of manufacture of claim 21, wherein the composition comprises a coating selected from the group consisting of coatings on plastic, coatings on metal, coatings on glass, coatings on carbon, coatings on ceramic, and coatings on wood products.

24. The article of manufacture of claim 23, wherein the coating comprises fibers, woven mats, nonwoven mats, cloths, broadgoods, fabrics, moldings, laminates, foams, or extruded shapes.

25. The article of manufacture of claim 21, wherein the composition is incorporated into an adhesive or comprises fabricated sheets, multilayer sheets, free-standing films, multi-layer films, fibers, foams, molded articles, or fiber reinforced composites.

* * * * *